United States Patent
Dura et al.

(10) Patent No.: US 11,219,831 B2
(45) Date of Patent: Jan. 11, 2022

(54) LIVE CAMERA VIDEO CHARACTER REPRESENTATIONS

(71) Applicant: Amazon Technologies, Inc., Seattle, WA (US)

(72) Inventors: Romain Dura, Bellevue, WA (US); Craig Sullivan, Los Angeles, CA (US); Scott William Cairns, San Francisco, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/825,966

(22) Filed: Mar. 20, 2020

(65) Prior Publication Data
US 2021/0291058 A1    Sep. 23, 2021

(51) Int. Cl.
*A63F 13/655* (2014.01)
*A63F 13/213* (2014.01)

(52) U.S. Cl.
CPC .......... *A63F 13/655* (2014.09); *A63F 13/213* (2014.09)

(58) Field of Classification Search
CPC ............................. A63F 13/655; A63F 13/213
See application file for complete search history.

(56) References Cited

U.S. PATENT DOCUMENTS

| | | | |
|---|---|---|---|
| 9,349,414 B1 * | 5/2016 | Furment | H04N 5/2258 |
| 2003/0038805 A1 | 2/2003 | Wong et al. | |
| 2011/0107220 A1 | 5/2011 | Perlman | |
| 2011/0302442 A1 | 12/2011 | Garrett et al. | |
| 2015/0088622 A1 | 3/2015 | Ganschow | |
| 2015/0121437 A1 | 4/2015 | Tan | |
| 2017/0001122 A1 | 1/2017 | Leung et al. | |
| 2017/0006074 A1 | 1/2017 | Oates, III | |

(Continued)

OTHER PUBLICATIONS

Learn OpenCV Face Detection—OpenCV, Dlib and Deep Learning ( C++/Python ); https://www.learnopencv.com/face-detection-opencv-dlib-and-deep-learning-c-python/; web-archive capture from May 10, 2019, Big Vision LLC; ©2019; accessed on Nov. 25, 2020 from https://web.archive.org/web/20190510104339/https://www.learnopencv.com/face-delection-opencv-dlib-and-deep-learning-c-python/; 17 pages.

(Continued)

*Primary Examiner* — James S. McClellan
(74) *Attorney, Agent, or Firm* — BakerHostetler

(57) ABSTRACT

Live camera video of video game players may be captured. Portions of the live video that include the player's faces may be inserted into the faces of characters that are controlled by the players and displayed in real-time. The players may stream video output from the video game to respective groups of spectators. The game video output may include a competition area and a competition audience that includes audience portions based on the groups of spectators that receive the game video output from the players. An audience member may be associated with a spectator, and the spectator's username, profile picture, chat messages and other spectator input may be displayed adjacent to the audience member. A queue of waiting players may be displayed simultaneously with current gameplay in the competition area, and a queued character may move to the competition area when an open competition slot becomes available.

19 Claims, 16 Drawing Sheets

(56) References Cited

U.S. PATENT DOCUMENTS

| | | | |
|---|---|---|---|
| 2018/0300927 A1* | 10/2018 | Hushchyn | H04L 65/602 |
| 2019/0037268 A1 | 1/2019 | Occhialini | |
| 2019/0099675 A1 | 4/2019 | Khan et al. | |
| 2019/0104235 A1 | 4/2019 | Sarkar | |
| 2020/0391122 A1 | 12/2020 | Hamilton et al. | |
| 2020/0406152 A1 | 12/2020 | Trombetta et al. | |

OTHER PUBLICATIONS

Learn OpenCV Face Detection—OpenCV, Dlib and Deep Learning (C++/Python); https://www.learnopencv.com/face-detection-opencv-dlib-and-deep-learning-c-python/; web-archive capture from May 10, 2019, Big Vision LLC; ©2019; accessed on Mar. 11, 2021 from https://web.archive.org/web/20190510104339/https://www.learnopencv.com/face- detection-opencv-dlib-and-deep-learning-c-python/; 19 pages.

International Patent Application No. PCT/US2021/023288; Int'l Search Report and the Written Opinion; dated Jul. 30, 2021; 20 pages.

International Patent Application No. PCT/US2021/023288; Invitation to Pay Add'l Fees; dated Jun. 9, 2021; 14 pages.

* cited by examiner

1010 Execute a video game that includes a character controlled by a player of the video game, wherein the character is displayed by the video game using a character representation that includes a face-related portion and a body-related portion

1012 Receive live camera video captured from a camera, wherein portions of the first live camera video include a face of the player

1014 Generate game video output including a character representation, wherein a face-related portion of character representation includes the portions of the live camera video that include the face of the player

1014A Detect the portions of the live camera video that include the face of the player

1014B Crop the live camera video to form cropped video content that includes the portions of the live camera video that include the face of the first player

1014C Resize the cropped video content to a size that is selected for the face-related portion

1014D Insert the resized cropped video content into the face-related portion

FIG. 10

LIVE CAMERA VIDEO CHARACTER REPRESENTATIONS

CROSS-REFERENCE TO RELATED APPLICATIONS

This application is related to the following application, which is hereby incorporated by reference in its entirety: U.S. patent application Ser. No. 16/825,948 filed Mar. 20, 2020, entitled "VIDEO GAME PLAYER, SPECTATOR AND AUDIENCE INTERACTION". This application is also related to the following application, which is also hereby incorporated by reference in its entirety: U.S. patent application Ser. No. 16/826,014 filed Mar. 20, 2020, entitled "VIDEO GAME WAITING QUEUE AND AUDIENCE INTERACTION".

BACKGROUND

The popularity of video streaming has increased rapidly in recent years. In some cases, video may be streamed using live streaming techniques, in which video of a live event (e.g., a video game) is captured, transmitted and played to spectators while the live event is still occurring, with only small amounts of latency between the time that the video is captured and played to the spectators. A streamer is a user that provides streamed video to spectators. For example, a streamer may be a video game player that provides video from a video game that he or she is playing. Game video output may be captured from the video game and then streamed to spectators. In some examples, in addition to the game video output, video of the streamer may also be captured, such as via a webcam or other camera, and streamed to spectators. In some examples, the video may include video of the streamer, for example including the streamer's face, as he or she discusses live gameplay.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 10 is a flowchart illustrating an example live camera video character generation process that may be used in accordance with the present disclosure.

DETAILED DESCRIPTION

Figure 1:
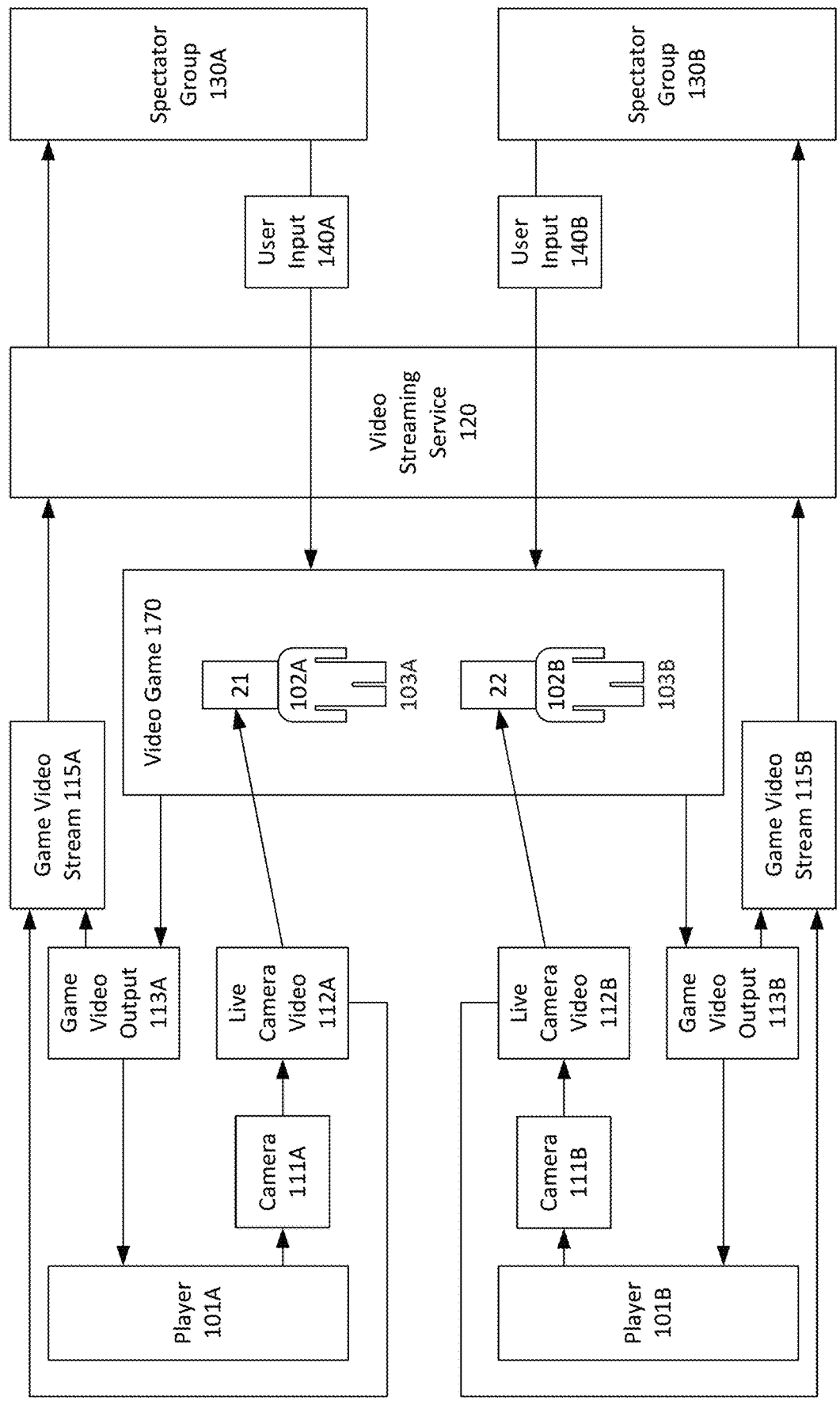
FIG. 1 is a diagram illustrating an example video game player and spectator interactivity system that may be used in accordance with the present disclosure.

Various techniques for personalized player, spectator and audience interaction with a video game are described herein. In particular, in some examples, live camera video of a game player may be used to generate a face and/or other features of a video game character. Specifically, while a player is playing a video game, live camera video of the player may be captured using a camera, such as a webcam. In some examples, the live camera video may include video of the player, for example including the player's face, as he or she participates in live gameplay. The video game may include a character controlled by the player, such as a character whose movements and other actions may be controlled by inputs received from the player. The techniques described herein may allow live video of the player's face, such as may be included in the live camera video captured by the webcam or other camera, to be used to generate a face of the character that is controlled by the player. In some examples, if the video game includes multiple players that control multiple characters, then live video of each player may be used to generate a face of a respective character controlled by each player. The use of camera video of the players may create a personalized experience, such as by allowing characters to closely resemble and be easily identified with players by whom they are controlled. Additionally, the video of a player's face may be displayed live and in real-time in a character's face within game video output. The use of live video may be advantageous, such as by allowing characters to reflect expressions (e.g., smiles, frowns, and other facial expressions) as they are being made, thereby allowing players and spectators to easily observe how different players are reacting to game events in real-time. Moreover, it is noted that the use of live video may allow the character's face to change dynamically throughout the course of gameplay. This creates a more realistic experience, for example as compared to inserting a static (i.e., non-changing) image into the character's face. The use of live video allows viewers to see how the player's expression and other facial features change dynamically in response to various game events. By contrast, the use of a static image would not allow viewers to see these changes.

A player's character may be displayed by the video game using a character representation that includes a face-related portion and a body-related portion. In some examples, the body-related portion may include graphics generated by the video game, such as a graphically-depicted torso, arms, legs, etc. The face-related portion may include portions of the live camera video that include the face of the player. In some examples, the face-related portion may be attached to, and detachable from, the body-related portion. For example, the face-related portion may be attached to the body-related portion when a character is alive and/or in active competition. However, in some examples, the face-related portion may be detached from the body-related portion, such as when a character is killed or defeated. In some examples, an automated facial detection process may be employed on frames of the live camera video to detect portions of the frames that include the player's face. For each frame, an area of the frame that corresponds to a detected face may then be cropped from the frame. The cropped area may then be resized to a size that is selected for the face-related portion. This process may enable live video of the player's face to be used to generate the character's face, regardless of the size of the player's face in the camera video, regardless of the distance of the player from the camera, and regardless of whether the player's face is centered in the camera video. Moreover, in some examples, if the player's face cannot be detected in one or more frames of the live camera video, then the live camera video may be obfuscated (e.g., blurred, replaced with other content or content from prior frames, etc.) from the face-related portion for the one or more frames. This may prevent inappropriate content from accidentally or even intentionally being included in the field of view of the camera and inserted into the face-related portion of the character.

Furthermore, in some examples, a number of features may be employed to provide additional interactivity between a video game and players as well as spectators of the video game. In particular, in some examples, players of the video game may be streamers that provide video of their gameplay to spectators. The term spectator, as used herein, refers to a user that views video from a video game while not being a current player of the video game. For example, game video output may be captured at a computing device operated by a player and then live streamed to the spectators. In some examples, the captured game video output may be transmitted from the player's device to a video streaming service and, in turn, from the video streaming service to the spectators. Each player may have his or her own respective group of spectators to which a respective game video stream from the player is streamed. In some examples, the video game may include a competition between players, and game video output may display the competition and a competition audience. Additionally, in some examples, the competition audience may include a number of audience portions, and each of the audience portions may correspond to a respective group of spectators associated with one of the players in the competition. For example, a first audience portion may correspond to a first group of spectators that receive a game video stream from a first player in the competition, while a second audience portion may correspond to a second group of spectators that receive a game video stream from a second player in the competition. Each audience portion may include a number of audience members. In some examples, relative sizes (e.g., number of audience members) of the audience portions may be determined based on relative numbers of spectators in each group of spectators. For example, if the first group of spectators that receive the game video stream from first player is twice the size of the second group of spectators that receive the game video stream from second player, then the first audience portion may be twice the size (e.g., may have twice as many audience members) of the second audience portion. Sizes of the audience portions may be adjusted dynamically during gameplay to represent changes in the sizes of the respective spectator groups. For example, the size of the first audience portion may increase or decrease based upon an increase or decrease of a quantity of spectators in first spectator group. In some examples, when multiple players join a single team within the competition, their respective audience portions may be combined into a combined audience portion, and the size of the combined audience portion may be based on the combined sizes of the spectator groups of the respective players. Additionally, when one or more players leave a team (or the team is dissolved), the combined audience portion may be reduced in size and/or split into one or more different audience portions to reflect the splitting or dissolving of the team.

In some examples, spectators of the game video streams may provide various user input associated with the video game. For example, a video streaming service that provides the game video streams may host a chat service associated with the video game that allows spectators to submit and share chat message input. The video streaming service may also allow spectators to submit and share other input, such as voting in polls, providing emojis, etc. In some examples, one of audience members in an audience portion may be associated with one of the spectators in a respective group of spectators. For example, the audience member may be permanently associated with the spectator or may become temporarily associated with the spectator, such as when the spectator provides input (e.g., submits a chat message, votes in a poll, provides emoji input, etc.). In some examples, the audience member may assume various characteristics of the associated spectator. For example, a profile picture and or identity (e.g., username) of the associated spectator may be displayed adjacent to the audience member or may even be incorporated into the display of the audience member itself (e.g., the spectator's profile picture may be used to generate/render the audience member's face). Moreover, if live video of the spectator is available, the live video may be used to generate the audience member's face. In some examples, an action associated with the audience member may be performed based, at least in part, on user input provided by the associated spectator. For example, an audience member may stand up, speak and/or cheer when the associated spectator provides user input. In one specific example, the audience member may speak text included in a chat message submitted by the associated spectator. In another specific example, text and/or emojis submitted by the associated spectator may be displayed adjacent to the audience member.

Additionally, in some examples, the game video output may include a waiting area that displays one or more waiting characters that are waiting to join a competition that is occurring in the competition area. For example, the waiting area may include a queue of waiting characters and may be displayed adjacent to the competition area. The waiting area and queue may be displayed simultaneously with live competition between players that is displayed in the competition area. In some examples, a player slot within the competition may open, such as when an existing player is defeated, killed or otherwise exits the competition. When this occurs, a character from the waiting area may be assigned to the open player slot, and the character may move from the waiting area to the competition area. Additionally, in some examples, an audience portion associated with the player that exited the competition may be removed from the competition audience and replaced with a new audience portion associated with the new player whose character has filled the open player slot.

FIG. 1 is a diagram illustrating an example video game player and spectator interactivity system that may be used in accordance with the present disclosure. As shown in FIG. 1, players 101A and 101B may participate in a video game 170. In this example, player 101A controls a character representation 103A within the video game 170, while player 101B controls a character representation 103B within the video game 170. For example, movements and other actions of character representations 103A and 103B may be controlled based on user inputs received from the players 101A and 101B, respectively. The players 101A and 101B may provide the user input to control the character representations 103A and 103B to the video game 170, for example via respective video game client applications. In some examples, the video game 170 may be implemented using video game server components in combination with video game client components. In some examples, respective video game client components may execute on a local/client device operated by each video game player, while the video game server components may be executed on one or more remote servers. Also, in some examples, the video game client components may receive user input from respective players, such as to control characters, etc., and provide the user input to the video game server components. The video game server components may, in turn, update and maintain game state based at least in part on the user inputs. This updated game state may, in turn, be used to generate game video and audio outputs. The video game 170 may generate a game video output 113A, which may be displayed to player 101A, for example on a display of a computer system operated by player 101A. The video game 170 may also generate a game video output 113B, which may be displayed to player 101B, for example on a display of a computer system operated by player 101B. In some examples, game video outputs 113A and 113B may be identical to one another. In other examples, game video outputs 113A and 113B may differ, such as showing different areas or fields of view of a virtual game world. For example, in some cases, game video output 113A may correspond to character representation 103A, such as by following and/or centering its field of view on the character representation 103A. By contrast, game video output 113B may correspond to character representation 103B, such as by following and/or centering its field of view on the character representation 103B.

In the example of FIG. 1, players 101A and 101B are streamers that provide respective game video outputs 113A and 113B to respective spectator groups 130A and 130B. Specifically, in this example, game video outputs 113A and 113B are included in respective game video streams 115A and 115B that are provided by players 101A and 101B to video streaming service 120. Video streaming service 120, in turn, provides respective game video streams 115A and 115B to respective spectator groups 130A and 130B. In some examples, players 101A and 101B may operate one or more screen capture components that capture video that is displayed to the players 101A and 101B and allow the captured video to be transmitted to the video streaming service 120. The game video streams 115A and 115B may be transmitted from players 101A and 101B to spectator groups 130A and 130B over one or more communications networks, for example one or more local area networks (LANs) or one or more wide area networks (WANs), such as the Internet. The game video streams 115A and 115B may be transmitted from players 101A and 101B to spectator groups 130A and 130B using streaming transmission techniques, in which portions of video content may be played and displayed to spectators while subsequent portions of the video content are still being transmitted. In some examples, the game video streams 115A and 115B may be transmitted from players 101A and 101B to spectator groups 130A and 130B using live streaming techniques, in which video of a live event (e.g., video game 170) may be transmitted to spectators, and at least part of the video content may be played while the live event is still occurring (e.g., while the video game 170 is still being played by the players 101A and 101B), albeit with some small amounts latency between the time that video content is captured by the players 101A and 101B and the time that the video is eventually played to spectator groups 130A and 130B.

As also shown in FIG. 1, cameras 111A and 111B may be employed to capture live camera video 112A and 112B of players 101A and 101B, respectively. For example, cameras 111A and 111B may be webcams included in computer systems operated by players 101A and 101B. In some examples, the live camera video 112A and 112B may each include video of a respective player 101A and 101B, for example including the player's face, as he or she participates in live gameplay. In some examples, live camera video 112A and 112B may each include video of a respective player 101A and 101B as he or she provides real-time commentary and/or discussion regarding live gameplay, for example in combination with corresponding audio of the player's voice. As shown in FIG. 1, live camera video 112A and 112B may each be included in a respective game video stream 115A and 115B and transmitted to a respective spectator group 130A and 130B.

The techniques described herein may allow live video of a player's face, such as may be included in the live camera video 112A and 112B captured by cameras 111A and 111B, to be used to generate a face of a character that is controlled by the player. The use of camera video of the players may create a personalized experience, such as by allowing characters to closely resemble and be easily identified with players by whom they are controlled. Additionally, the video of a player's face may be displayed live and in real-time in a character's face within game video output. The use of live video may be advantageous, such as allowing characters to reflect expressions (e.g., smiles, frowns, and other facial expressions) as they are being made, thereby allowing players and other spectators to easily observe how different players are reacting to game events in real-time. Specifically, in this example, character representation 103A is controlled by player 101A and is a visual representation of a character that corresponds to (and is controlled by) player 101A. Character representation 103B is controlled by player 101B and is a visual representation of a character that corresponds to (and is controlled by) player 101B. Character representations 103A and 103B may be rendered in game video output 113A and/or game video output 113B.

As shown in FIG. 1, character representation 103A includes a face-related portion 21 and a body-related portion 102A, while character representation 103A includes a face-related portion 22 and a body-related portion 102B. In some examples, the body-related portions 102A and 102B may include graphics generated by the video game 107, such as a graphically-depicted torso, arms, legs, etc. The face-related portion 21 may include portions of the live camera video 112A and that include the face of player 101A. The face-related portion 22 may include portions of the live camera video 112B that include the face of player 101B. In some examples, each face-related portion 21 and 22 may be attachable to, and detachable from, a respective body-related portion 102A and 102B. For example, the face-related portion 21 may be attached to the body-related portion 102A when a character corresponding to player 101A is alive and/or in active competition. However, in some examples, the face-related portion 21 may be detached from the body-related portion 102A, such as when a character corresponding to player 101A is killed or defeated. In some examples, upon being detached, the face-related portion 21 may be manipulated (e.g., thrown, kicked, etc.) by other characters or objects within the video game and may eventually be re-attached to the body-related portion 102A. For example, another player could kick the face-related portion 21 towards the body-related portion 102A and thereby cause the face-related portion 21 to re-attach to body-related portion 102A.

Figure 2:
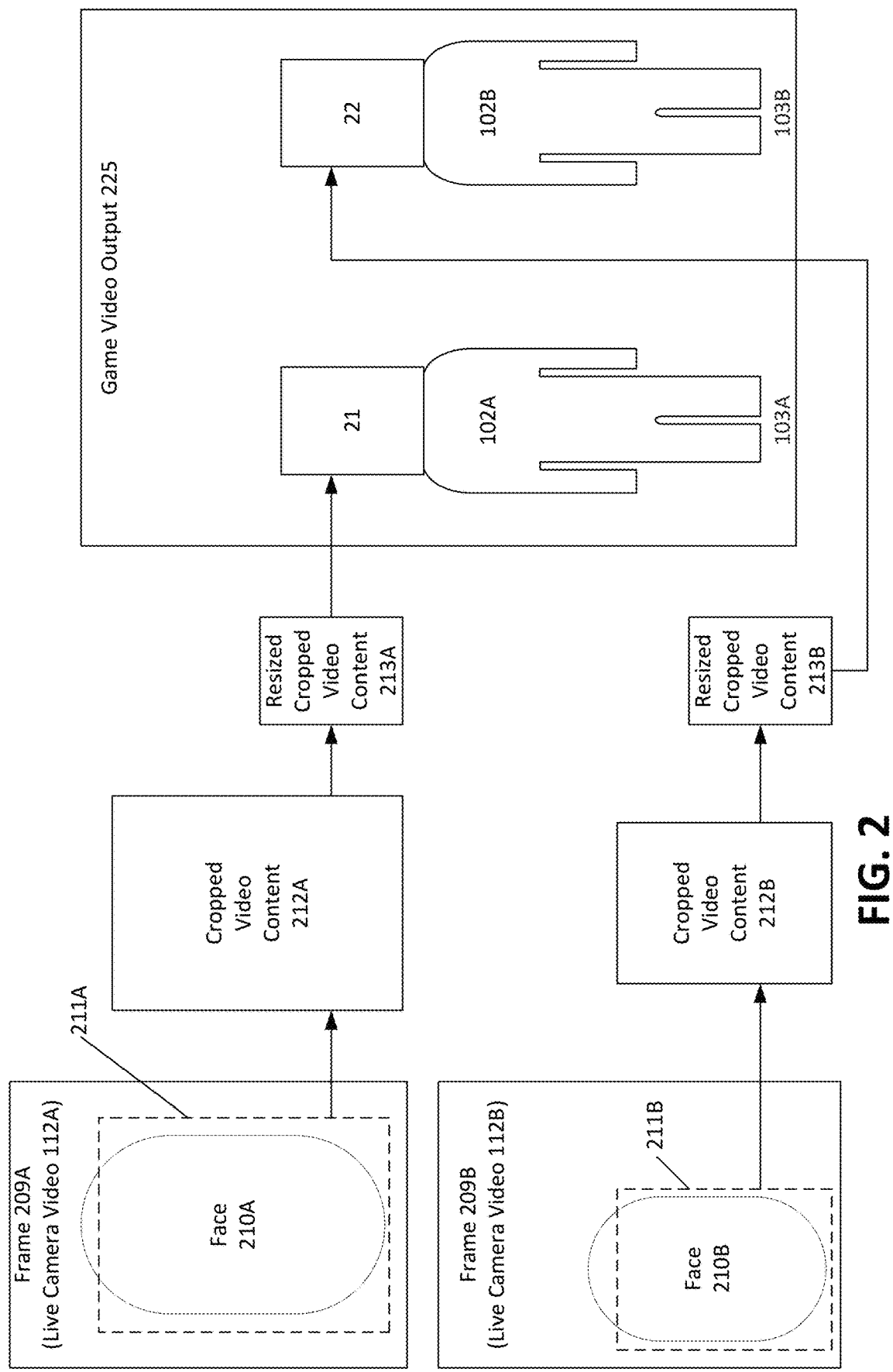
FIG. 2 is diagram illustrating example character generation based on live camera video that may be used in accordance with the present disclosure.

In some examples, an automated facial detection process may be employed on frames of the live camera video 112A and 112B to detect portions of the frames that include the player's face. For each frame, an area of the frame that corresponds to a detected face may then be cropped from the frame. The cropped area may then be resized to a size that is selected for the face-related portion. This process may enable live video of the player's face to be used to generate the character's face, regardless of the size of the player's face in the camera video, regardless of the distance of the player from the camera, and regardless of whether the player's face is centered in the camera video. Referring now to FIG. 2, a frame 209A of live camera video 112A is shown. The frame 209A includes a face 210A of player 101A. Additionally, a frame 209B of live camera video 112B is shown. The frame 209B includes a face 210B of player 101B. As shown, face 210A of player 101A in frame 209A is larger than face 210B of player 101B in frame 209B. In some examples, this may be because player 101A is closer to his respective camera 111A than player 101B is to his respective camera 111B (and/or because camera 11A has a higher zoom level than camera 111B). Additionally, it is noted that face 210A of player 101A is approximately centered in frame 209A, while face 210B is positioned in the lower left corner of frame 209B. However, even though faces 210A and 210B have different sizes and occupy different positions in respective frames 209A and 209B, the techniques described herein may nevertheless allow the faces 210A and 210B to both be used to generate respective face-related portions 21 and 22.

Specifically, as shown in FIG. 2, faces 210A and 210B may be detected in frames 209A and 209B, such as using an automated facial detection process. Upon detecting face 210A in frame 209A, an area 211A of frame 209A that corresponds to face 210A may be identified. Additionally, upon detecting face 210B in frame 209B, an area 211B of frame 209B that corresponds to face 210B may be identified. In some examples, areas 211A and 211B may be centered on the respective detected faces 210A and 210B. Upon being identified, the area 211A may be cropped from the frame 209A to form cropped video content 212A, while the area 211B may be cropped from the frame 209B to form cropped video content 212B. It is noted that it is not required that the cropped video content must include an entire face of a respective player. For example, some areas along the edges of a face (e.g., top of scalp or hair, bottom of chin, ears, etc.) may sometimes not be included in the cropped video content. Moreover, it is also not required that the cropped video content must include only the face. For example, some areas along the edges of the cropped video content may extend beyond the face and may include background (e.g., walls, doors, etc.) that may be adjacent to the face. In some examples, background or other non-facial image content that is included in the cropped video content may be detected and replaced with a filler, such as a solid color filler.

Next, the cropped video content 212A may be resized into resized cropped video content 213A, which is equivalent to a selected size of face-related portion 21 in game video output 225. The resized cropped video content 213A may then be inserted into face-related portion 21 of character representation 103A corresponding to player 101A. Similarly, the cropped video content 212B may be resized into resized cropped video content 213B, which is equivalent to a selected size of face-related portion 22 in game video output 225. The resized cropped video content 213B may then be inserted into face-related portion 22 of character representation 103B corresponding to player 101B. It is noted that the facial detection, cropping and resizing operations shown in FIG. 2 may be performed at a variety of locations, including a client device local to a player and/or one or more game server or other components or devices remote from the player. In some examples, it may be advantageous to perform the facial detection and cropping operations at the client, as this may reduce the amount of video data that may be sent from the client to the game server for processing, thereby potentially reducing the amount of bandwidth required for transmission and potentially improving the speed and quality of transmission. It is noted that, while frames 209A and 209B include respective faces 210A and 210B, not every frame of each live camera video may include a player's face. For example, in some cases, players may temporarily step away from a camera or otherwise leave a camera's field of view during gameplay. Also, in some cases, a user could insert inappropriate content into a camera's field of view, such as obscene or offensive content. In some examples, if the player's face cannot be detected in one or more frames of the live camera video, then the live camera video may be obfuscated from the face-related portion for the one or more frames. For example, the face-related portion may include a blurred view of the live camera video or may include one or more prior (non-live) images of the player's face that were detected in one or more prior frames of the live camera video. In other examples, the live camera video may be replaced by a graphical icon or object in the face-related portion that indicates that the player's face cannot currently be detected in the live camera video. This may help to prevent inappropriate content from accidentally or even intentionally being included in the field of view of the camera and inserted into the face-related portion of the character.

In some examples, in addition to live video, live audio of the players 101A and 101B may also be captured, for example using a microphone that may be included or attached to cameras 111A and 111B. In some examples, both the live video of the players 101A and 101B and the live audio of the players 101A and 101B may be output by the video game 170 in real-time. This may allow the game audio output to include words that are spoken by players whose faces are shown in the face-related portions of the characters in the game video output.

Figure 3:
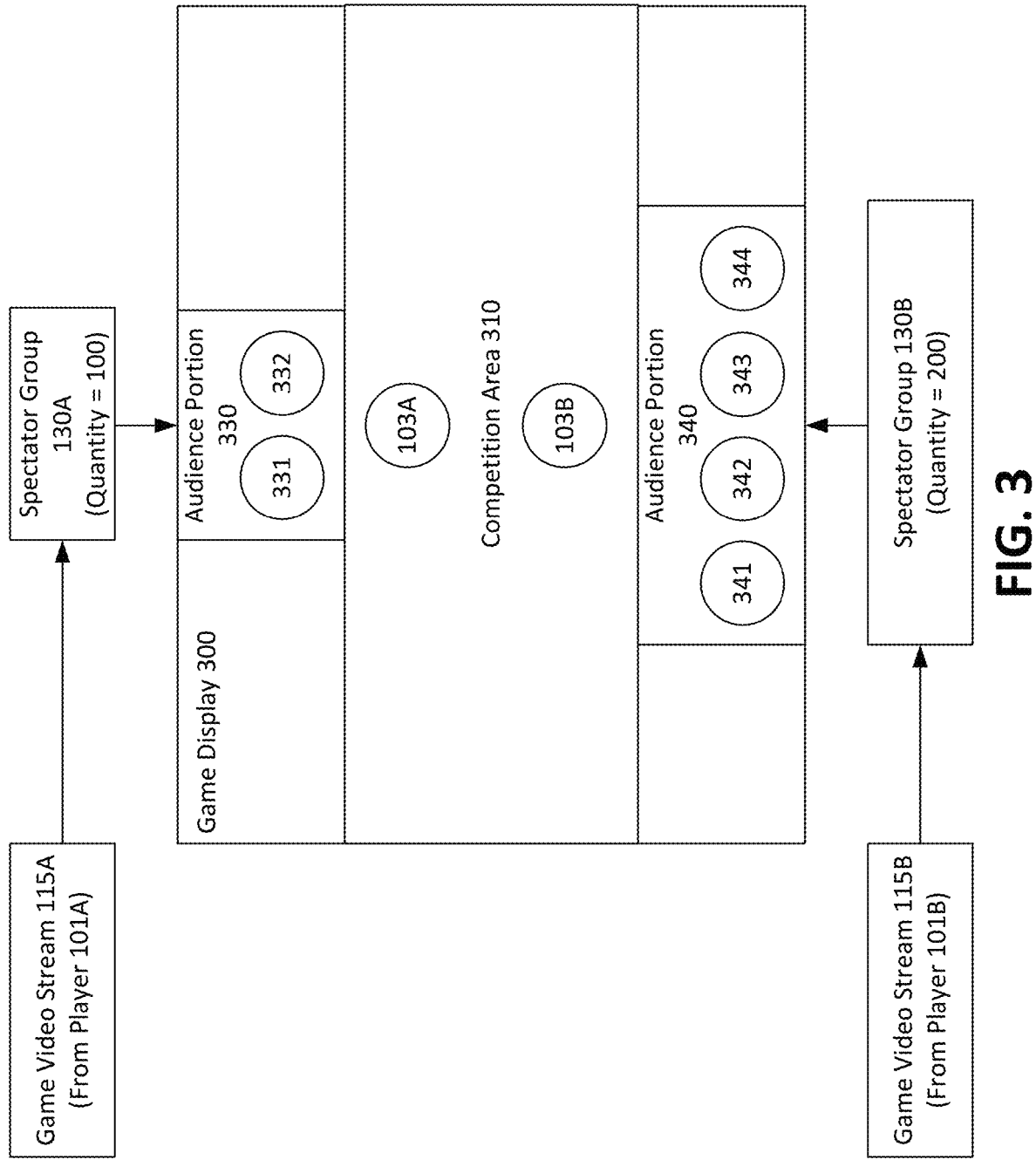
FIG. 3 is a diagram illustrating example audience portions that may be used in accordance with the present disclosure.

Referring back to FIG. 2, it is seen that players 101A and 101B are streamers that provide video of their gameplay (e.g., game video outputs 113A and 113B in game video streams 115A and 115B) to spectator groups 130A and 130B, respectively. In some examples, the video game may include a competition between players, and game video output may display the competition and a competition audience. Additionally, in some examples, the competition audience may include a number of audience portions, and each of the audience portions may correspond to a respective group of spectators associated with one of the players in the competition. For example, a first audience portion may correspond to a first group of spectators that receive a game video stream from a first player in the competition, while a second audience portion may correspond to a second group of spectators that receive a game video stream from a first player in the competition. In some examples, relative sizes (e.g., number of audience members) of the audience portions may be determined based on relative numbers of spectators in each group of spectators. For example, if the first group of spectators that receive the game video stream from first player is twice the size of the second group of spectators that receive the game video stream from second player, then the first audience portion may be twice the size (e.g., may have twice as many audience members) of the second audience portion. Referring now to FIG. 3, it is seen that an example game display 300 may correspond to a competition between players 101A and 101B. In some examples, game display 300 may be included in game video outputs 113A and/or 113B as well as game video streams 115A and/or 115B. In this example, game display 300 includes a competition area in which the competition between players 101A and 101B occurs. As shown, competition area includes character representation 103A (corresponding to player 101A) and character representation 103B (corresponding to player 101A). In the example of FIG. 3, character representations 103A and 103B are depicted as circles for ease of illustration and simplicity. It is noted, however, that the character representations 103A and 103B may take other shapes or forms, such as those shown in FIGS. 1 and 2. In the example of FIG. 3, game display 300 also includes a competition audience including audience portions 330 and 340. Specifically, audience portion 330 corresponds to spectator group 130A that receives game video stream 115A from player 101A, while audience portion 340 corresponds to spectator group 130B that receives game video stream 115B from player 101B. In this example, audience portion 330 includes two audience members 331-332, while audience portion 340 includes four audience members 341-344. As indicated in FIG. 3, in this example, spectator group 130A has a quantity of one-hundred spectators, while spectator group 130B has a quantity of two-hundred spectators. In the example of FIG. 3, each audience member 331-332 and 341-344 represents fifty spectators. Specifically, because the spectator group 130A includes one-hundred spectators, audience portion 330 includes two audience members 331-332 representing fifty spectators each. Additionally, because the spectator group 130B includes two-hundred spectators, audience portion 330 includes four audience members 341-344 representing fifty spectators each. Thus, in the example of FIG. 3, the relative sizes (e.g., quantities of included audience members) of audience portions 330 and 340 are based on (e.g., are proportional to) relative sizes (e.g., quantities of included spectators) of the respective spectator groups 130A and 130B.

In the example of FIG. 3, audience members 331-332 and 341-344 are depicted as circles for ease of illustration and simplicity. It is noted, however, that the audience members 331-332 and 341-344 may take other shapes or forms. It is also noted that the shapes and forms of the audience members may change dynamically throughout gameplay. It is also noted that, while audience members 331-332 and 341-344 each represent fifty spectators in this example, audience members may represent different quantities of spectators—and that these quantities may also change dynamically throughout gameplay. For example, in some cases, there may be a one-to-one correspondence between spectators and audience members, though this ratio may sometimes be impractical or difficult to achieve for games with large quantities of spectators. Additionally, in some cases, when the quantities of spectators of a video game increase over time, the quantity of spectators represented by each audience member may also increase. By contrast, in some cases, when the quantities of spectators of a video game decrease over time, the quantity of spectators represented by each audience member may also decrease. Furthermore, it is noted that FIG. 3 merely illustrates one example arrangement of audience portions (e.g., at opposite ends/edges of a competition area) and that many other different arrangements may be employed. Moreover, in some examples, a variety of different types of audience settings may be employed in combination with the techniques described herein. For example, in some cases, audience members may appear to be sitting in stadium bleachers or auditorium seats. In other examples, audience members may appear to stand at various locations, such as on sidewalks, along edges of a golf course, along a racetrack, in a moving vehicle, etc. In some examples, the arrangements, settings and/or other features of the audience portions may vary based on a quantity of spectators and/or audience members. For example, in some cases, audiences with smaller quantities of audience members may display the audience members with larger sizes and/or more detailed visual features (e.g., facial characteristics, clothing, etc.), while audiences with smaller quantities of audience members may display the audience members with smaller sizes and/or less detailed visual features. For example, for smaller audiences, the entire bodies of audience members may be shown, while, for larger audiences, the audience members may be displayed as packed into bleachers with only their faces being shown.

In some examples, sizes of the audience portions may be adjusted dynamically to represent changes in the sizes of the respective spectator groups. For example, referring now to FIG. 4, it is seen that the quantity of spectators in spectator group 130A has increased from one-hundred spectators (as indicated in FIG. 3) to one-hundred-fifty spectators (as indicated in FIG. 3). In order to reflect this increase, an additional third audience member 333 is added to audience portion 330 to represent the fifty additional spectators that have been added to spectator group 130A. In some examples, information about a player's respective spectator groups, including quantities of spectators and changes in quantities of spectators, may be provided from video streaming service 120 to one or more video game server components of the video game 170. Additionally, in some examples, a player may delegate his or her respective audience portion to another streamer, such as a streamer that is not a current player of the same video game as the delegating player. For example, player 101A may delegate his respective audience portion 330 to another streamer, such as a streamer that is not currently playing video game 170. In this example, audience portion 330 may be replaced with a new audience portion corresponding to another group of spectators that receive video from the other streamer. For example, a relative size of the new audience portion may be based on a relative size of the other group of spectators that receive video from the other streamer. In some examples, when another streamer enters a same chat room as a current game player, the current game player may be presented with an option to delegate his stream to the other streamer.

Figure 5A:
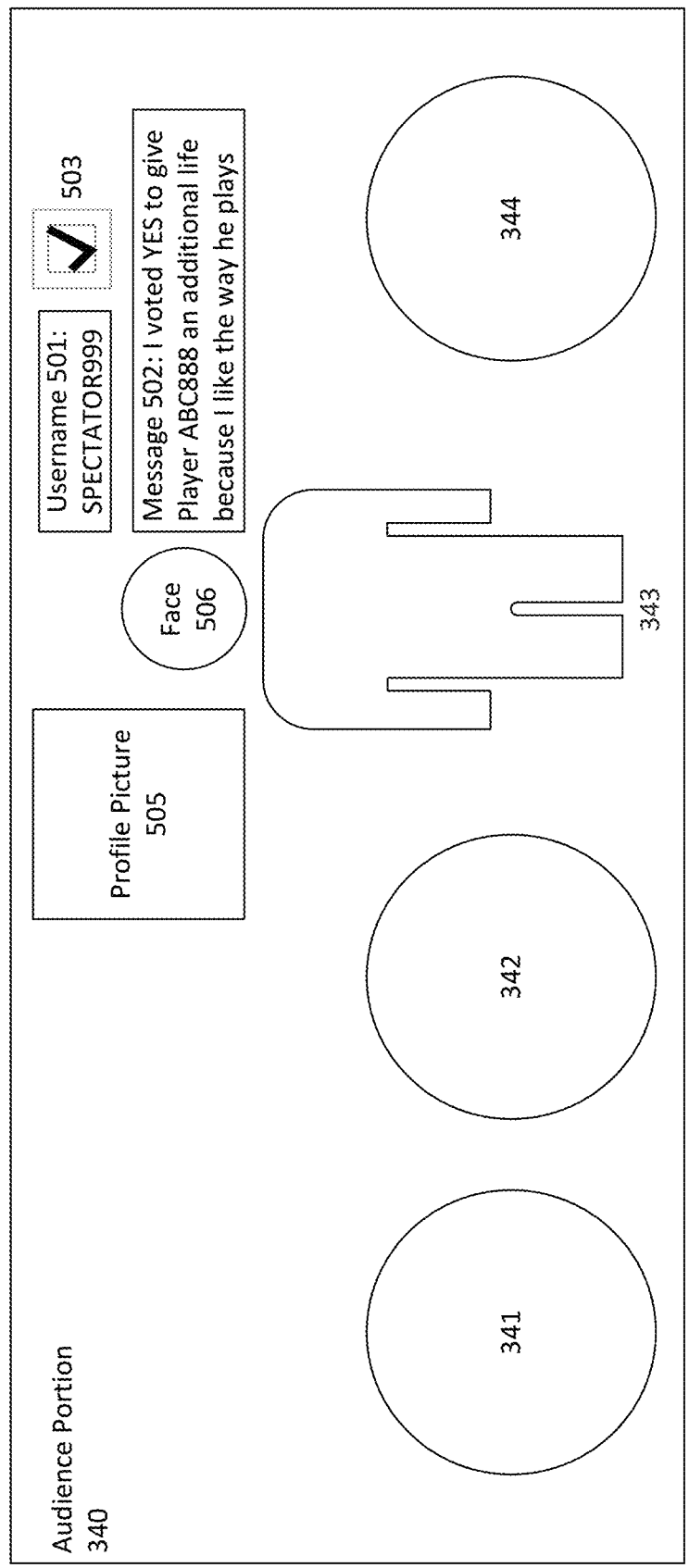
FIG. 5A is a diagram illustrating an example audience member rendering that may be used in accordance with the present disclosure.

In some examples, spectators of the game video streams may provide various user input associated with the video game. Unlike game players, however, spectators do not directly control characters that compete with one another within the video game. In some examples, the spectators may view the game video output via a non-game application, such as a client application of the video streaming service and/or a browser application. Moreover, user input may be received from the spectators via one or more interfaces provided by these non-game applications. Referring back to FIG. 1, it is seen that spectators within spectator groups 130A and 130B may provide user input 140A and 140B, respectively. In some examples, user input 140A and 140B from spectator groups 130A and 130B may be provided to one or more video game server components of the video game 170, for example via video streaming service 120. The video game server components may, in turn, update game state based on this information. For example, video streaming service 120 may host a chat service associated with the video game 170 that allows spectators to submit and share chat message input regarding the video game. The video streaming service may also allow spectators to submit and share other input, such as voting in polls, providing emojis, etc. In one specific example, the user input 140A and 140B could include requests with instructions for creating certain features in the video game 170, such as requests for how to build a boss and/or other graphical objects or features within the video game 170. In some cases, the requests could even include images or video specifying how the spectators would like the features to appear within the video game. In some examples, the user input 140A and 140B may be provided to the video game 170, either directly from the spectators or via the video streaming service 120 or another intermediary. In some examples, one of audience members in an audience portion may be associated with one of the spectators in a respective group of spectators. For example, the audience member may be permanently associated with the spectator or may become temporarily associated with the spectator, such as when the spectator provides input (e.g., submits a chat message, votes in a poll, provides emoji input, etc.). Referring now to FIG. 5A, it is seen that particular spectator (SPECTATOR999) from spectator group 130B has been associated with audience member 343. In this example, SPECTATOR999 becomes associated with audience member 343 as a result of SPECTATOR999 providing user input that includes voting in a poll and submitting a chat message relating to the vote. In this example, the association of SPECTATOR999 with audience member 343 causes the audience member 343 to stand up and to have the full body of the audience member 343 be displayed. In some examples, other features or characteristics of an audience member 343 may change based upon being associated with a spectator, such as a shape, size, color scheme, and the like. As shown in FIG. 5A, when SPECTATOR999 is associated with audience member 343, an identity of SPECTATOR999 (e.g., the username SPECTATOR999) is displayed in a username field 501 adjacent to the audience member 343. Additionally, in this example, a profile picture 505 of SPECTATOR999 is displayed adjacent to audience member 343. In some examples, the audience member 343 may assume various characteristics of SPECTATOR999. For example, the profile picture 505 of SPECTATOR999 may be used to generate/render the face 506 of audience member 343. Moreover, if live video of SPECTATOR999 is available, the live video may be used to generate the face 506 of audience member 343. In some examples, an audience member may be associated with multiple spectators, and the features or characteristics of the audience member may be adjusted to reflect any of the above or other information for the multiple spectators.

In some examples, an action associated with an audience member may be performed based, at least in part, on user input provided by an associated spectator. For example, various visual and/or audio indicators may be generated to indicate that an associated spectator has provided user input. In some examples, an audience member may stand up, speak and/or cheer when the associated spectator provides user input. In the example of FIG. 5A, audience member 343 stands up based on the user input provided by SPECTATOR999. Additionally, a checkmark icon 503 is displayed adjacent to audience member 343 to indicate that SPECTATOR999 has voted YES in a poll. Additionally, a message field 502 displays text of a chat message submitted by SPECTATOR999. In some examples, audience member 343 may speak the text of the chat message displayed in message field 502. Many other types of visual and/or audio indicators of the user input may also be employed. For example, in some cases, an audience member and/or the audience member's username field 501 could flash and become enlarged to indicate that an associated spectator has provided user input. The audience member may also change location (e.g., move to the front of the bleachers) when it is reflecting user input provided by a spectator. In other examples, messages provided by a spectator could be parsed and keywords within the message could be examined to determine a message context (e.g., happy, sad, excited, frightened, etc.) and a facial expression (e.g., smile, frown, etc.) or other feature (e.g., putting hand over eyes, etc.) of the audience member could be adjusted to reflect the context of the message or to reflect a type of emoji submitted by the spectator.

Figure 5B:
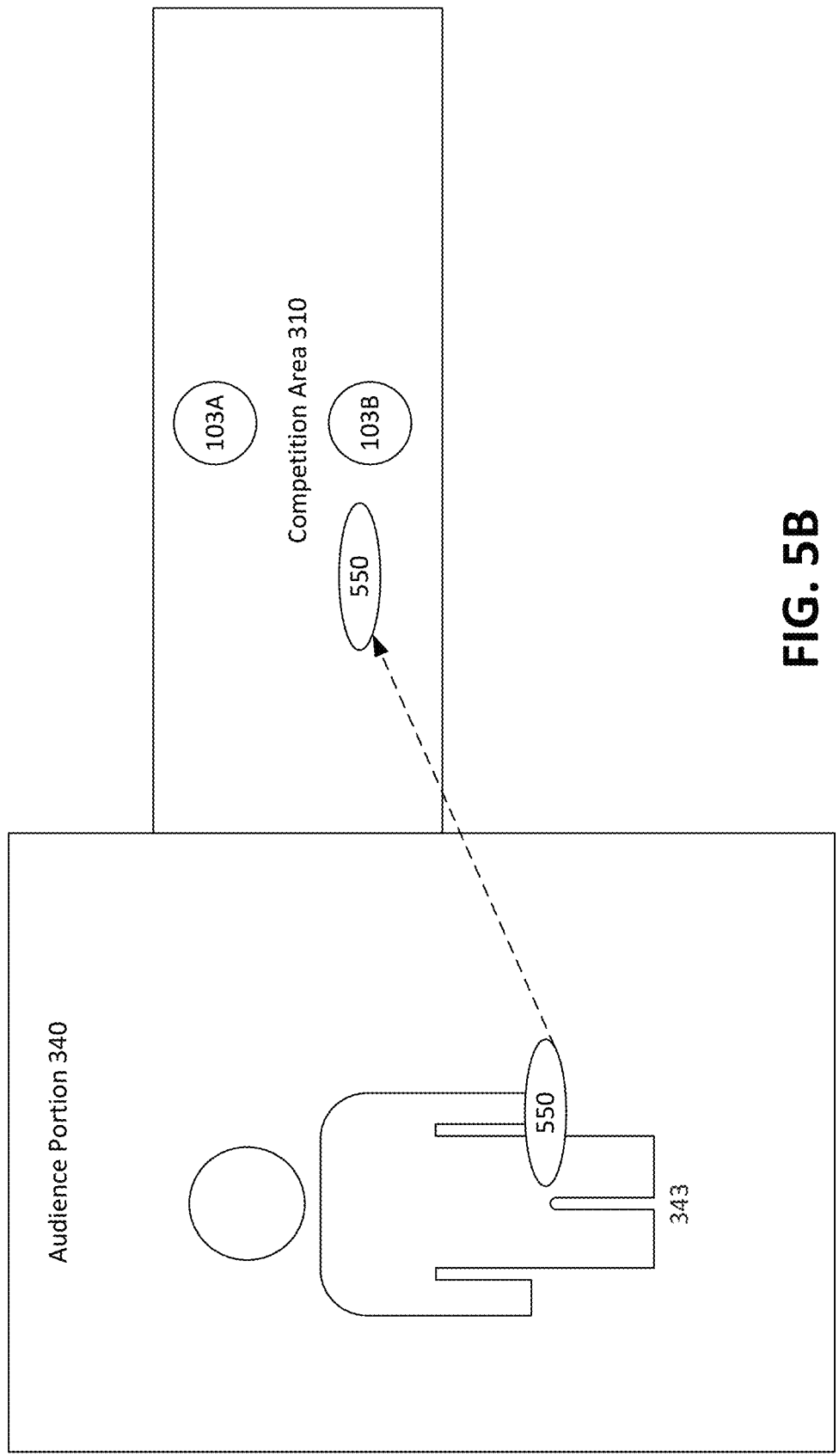
FIG. 5B is a diagram illustrating an example of an audience member throwing an object into a competition area that may be used in accordance with the present disclosure.

In some examples, an audience member within one of the audience portions may interact with the competition area. For example, referring now to FIG. 5B, an example is shown in which audience member 343 throws an object 550 from audience portion 340 into the competition area 310. In some examples, a spectator associated with viewer 343 (e.g., SPECTATOR999) may provide user input that causes the object 550 to be thrown. In one specific example, the audience member may throw trash onto the competition area 310, such as to express frustration or displeasure. In another example, the object 550 may be a weapon or tool, such as a weapon that may be used by a player that the associated spectator wishes to assist. In yet another example, the object 550 may be an obstacle, such as obstacle that is thrown to a location to obstruct a path of a player that the associated spectator wishes to impede. In some examples, the spectator associated with viewer 343 may acquire the object 550 based on his or her relationship with the video streaming service 120, such as by acquiring a certain membership or other status level associated with the video streaming service 120. In addition to acquiring object 550, any of the other fields or visual and audio indicators described above in relation to spectator 343 may be acquired and generated based on this status level.

Figure 6A:
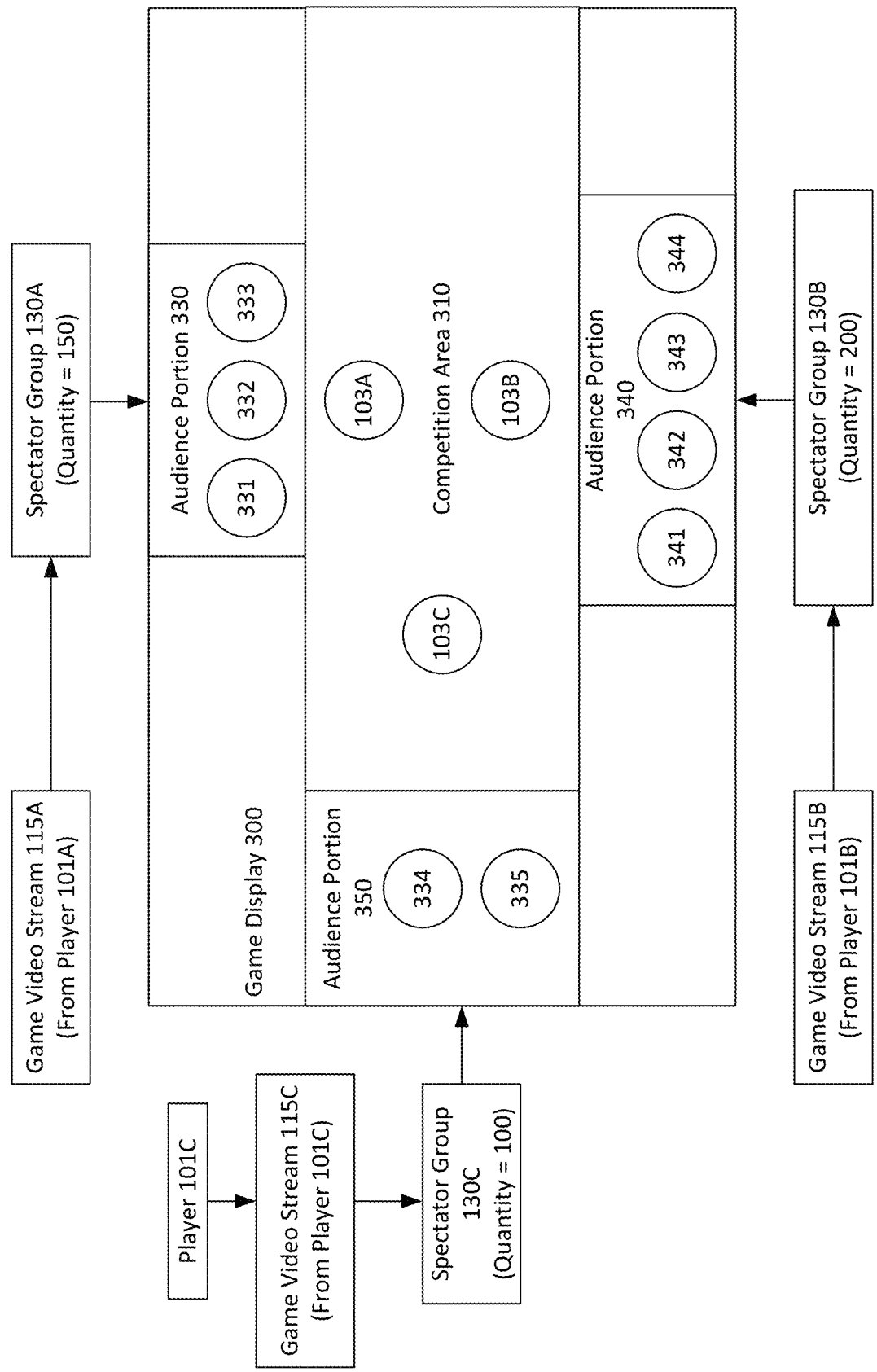
FIGS. 6A and 6B are diagrams illustrating an example combination of audience portions that may be used in accordance with the present disclosure.
Figure 6B:
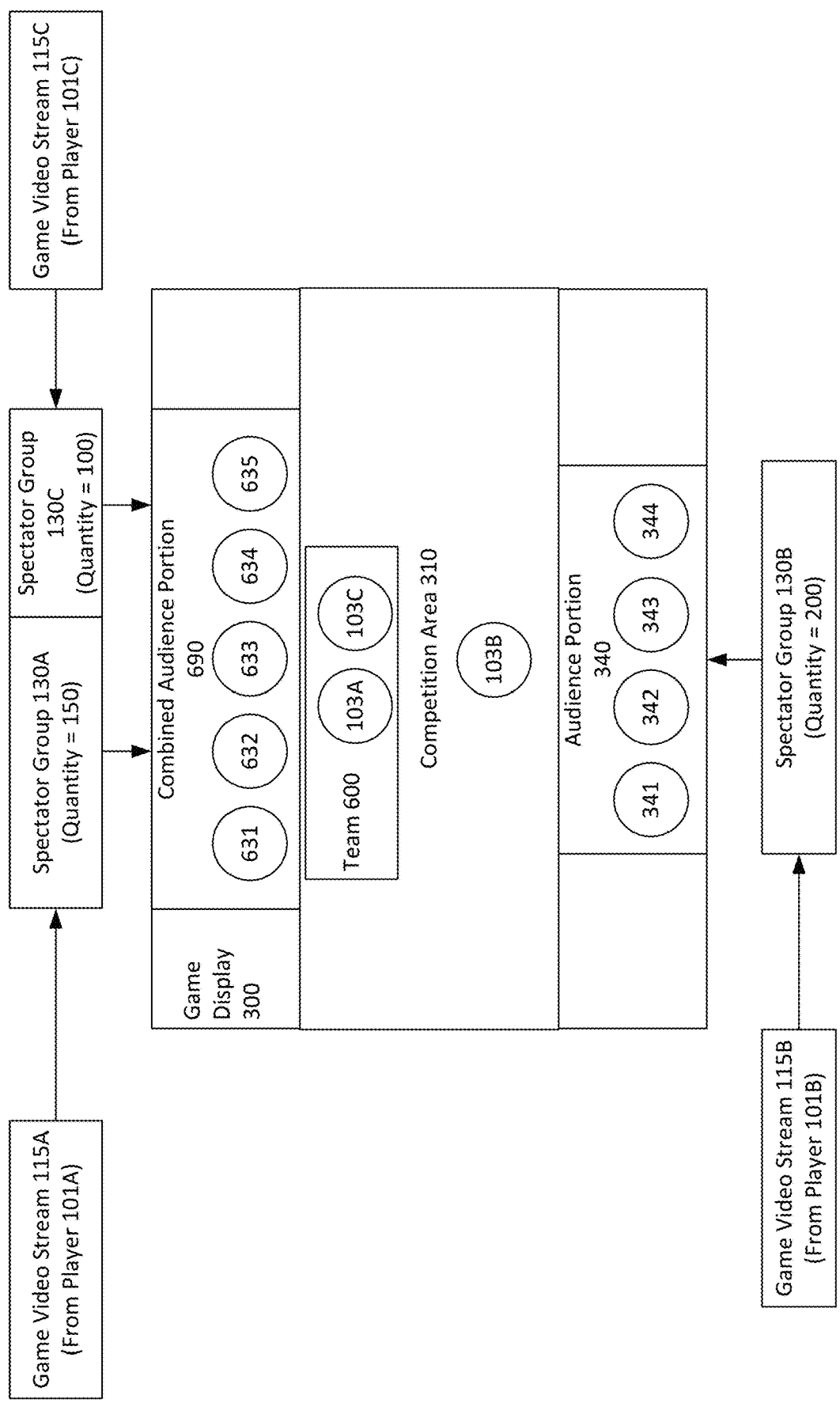

In some examples, when multiple players join a single team within the competition, their respective audience portions may be combined into a combined audience portion, and the size of the combined audience portion may be based on the combined sizes of the spectator groups of the respective players. For example, referring to FIG. 6A, it is seen that a third player 101C having an associated character representation 103C joins a competition that occurs in competition area 310. The third player 101C provides a game video stream 115C to a respective spectator group 130C. As shown, an audience portion 350 is added to the audience to correspond to spectator group 130C. The audience portion 350 has two audience members 334 and 335 that represent the one-hundred spectators within spectator group 130C. Referring now to FIG. 6B, it is seen that character representations 103A and 103C (along with their corresponding players 101A and 101C) have joined a together as a team 600. In this example, when players 101A and 101C join together as a team, their respective audience portions 330 and 350 may be merged/combined into a combined audience portion 690. As shown, the combined audience portion 690 includes five audience members 631-635 that represent the combine two-hundred-fifty spectators in spectator groups 130A and 130C. It is noted that there is no requirement that players on a team must have their audience portions merged—and in some examples the audience portions 330 and 350 may remain separate even when players 101A and 101C are combined into a single team.

Figure 7:
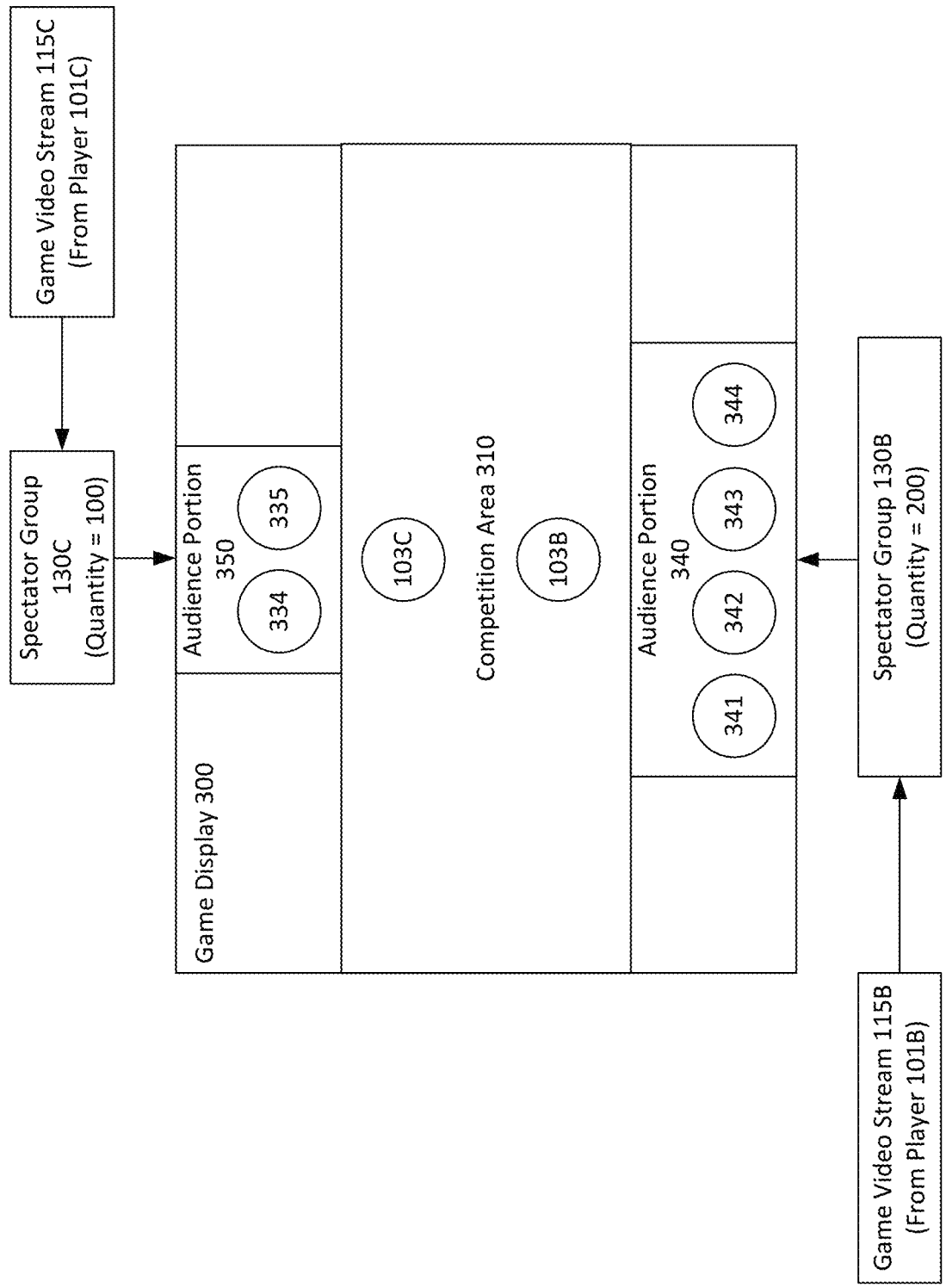
FIG. 7 is a diagram illustrating an example reduced audience portion that may be used in accordance with the present disclosure.

Additionally, when one or more players leave a team (or the team is dissolved), the combined audience portion may be reduced in size and/or split into one or more different audience portions to reflect the splitting or dissolving of the team. For example, in some cases, if players 101A and 103C were to break up their team and return to competing separately in the competition, then the combined audience portion 690 could be split back into audience portions 330 and 350 as shown in FIG. 6A. By contrast, FIG. 7 illustrates an example in which player 101C remains in the competition but player 101A exits the competition (as opposed to remaining in the game but competing separately). In this example, combined audience portion 690 is reduced into audience portion 350 to reflect that player 101A has left but that player 101C remains in the competition.

Figure 8:
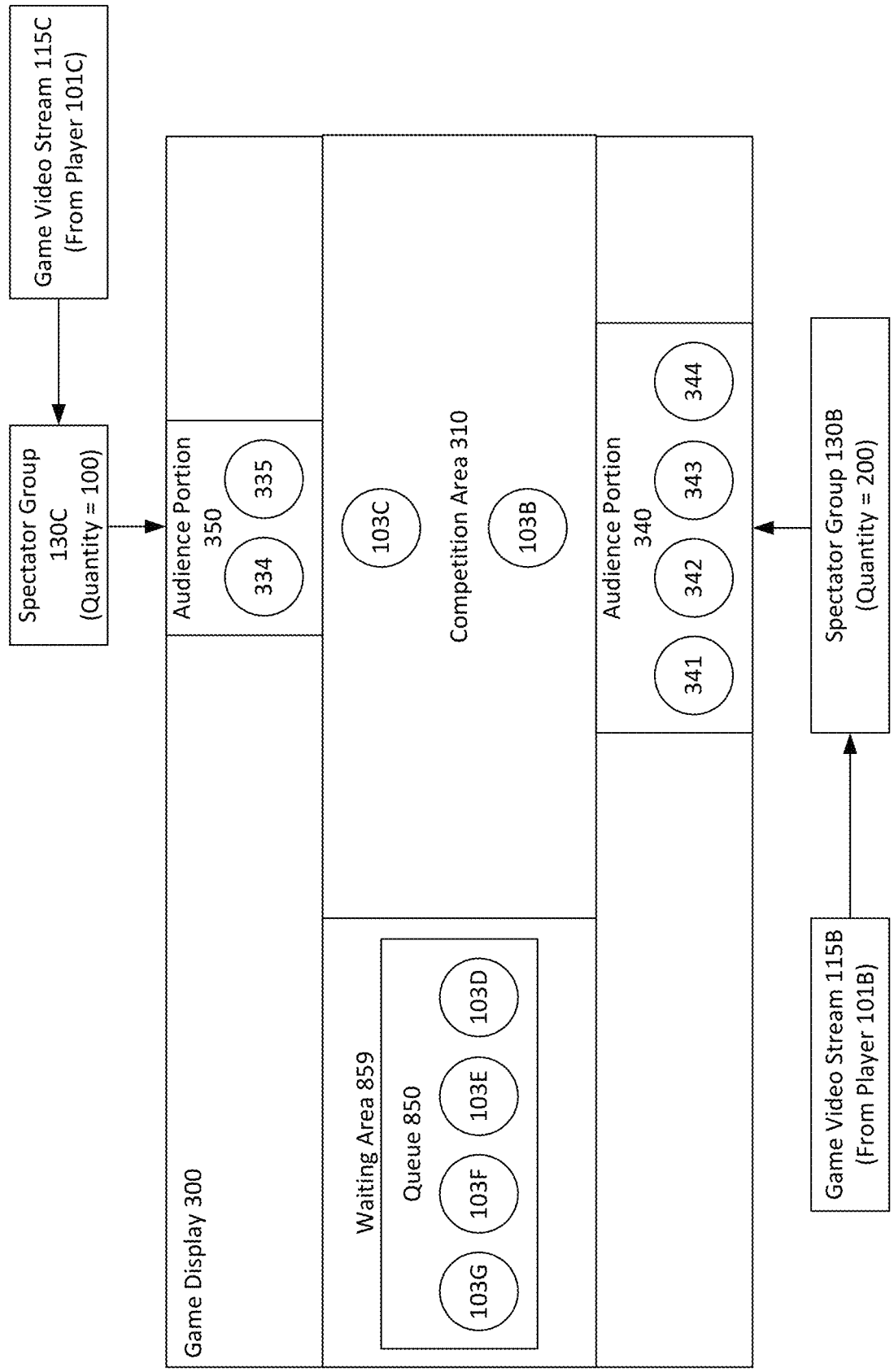
FIG. 8 is a diagram illustrating an example waiting area and queue that may be used in accordance with the present disclosure.

In some examples, the game video output may include a waiting area that displays one or more waiting characters that are waiting to join a competition that is occurring in the competition area. For example, the waiting area may include a queue of waiting characters and may be displayed adjacent to the competition area. Referring now to FIG. 8, an example is shown in which game display 300 includes both a competition area 310 and a waiting area 859. As shown, the waiting area 859 includes a queue 850 that includes character representations 103D-G for four respective characters that are waiting to join a competition in competition area 310. The waiting area 859 and queue 850 (including the characters displayed therein) are displayed simultaneously with live competition between players that is displayed in the competition area 310. Although the character representations 103D-G in waiting area 859 are displayed as circles in FIG. 9, they may take other shapes or forms, for example including a body-related portion and face-related portion that may include live video of a respective player as described above. In this example, character representation 103D is at the front of the queue 850, meaning that it will have the highest priority (e.g., ahead of character representations 103E-G) to fill the next open competition slot (e.g., when character representations 103B and/or 103C exit the competition).

Figure 9:
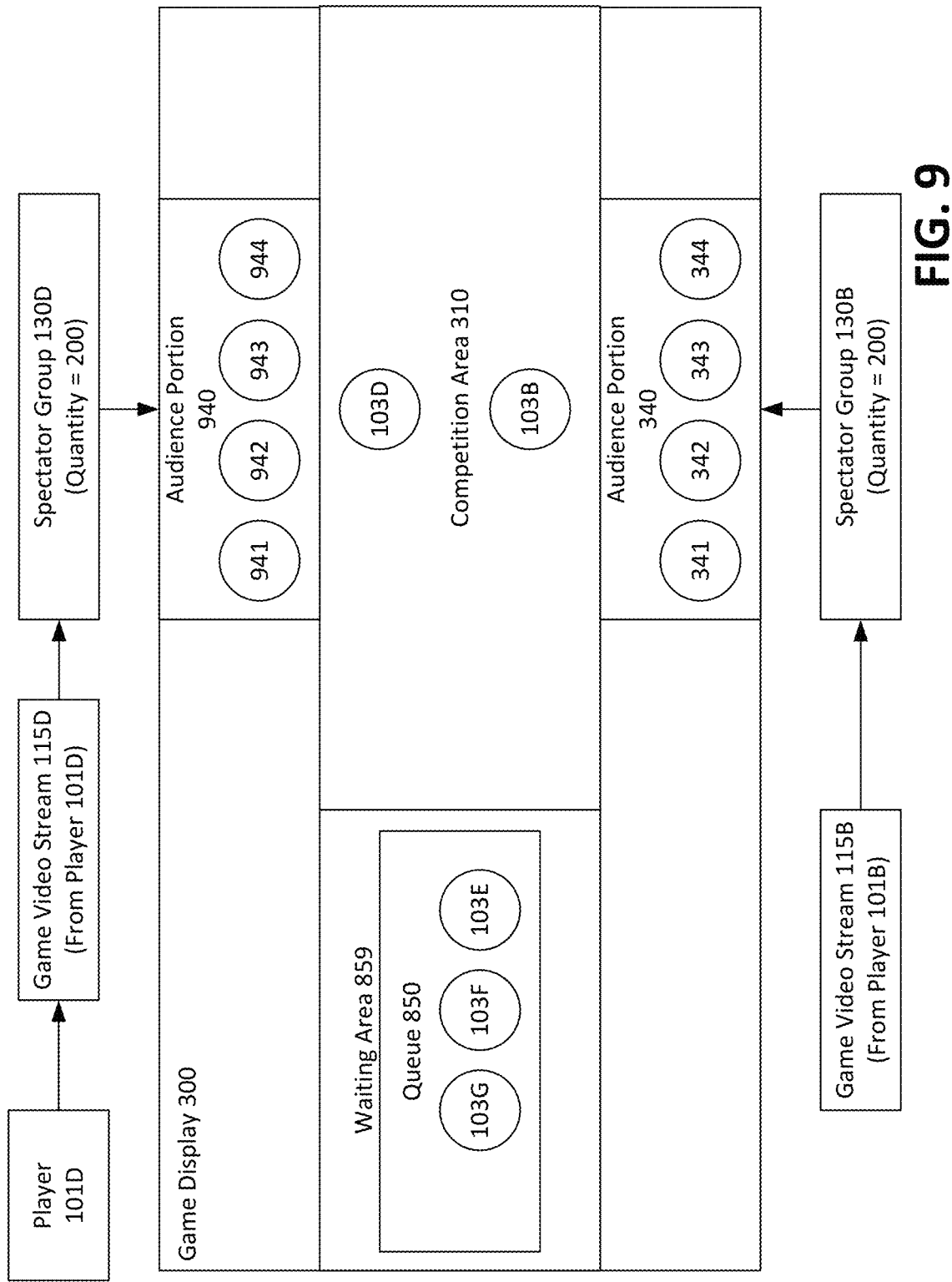
FIG. 9 is a diagram illustrating an example audience portion replacement that may be used in accordance with the present disclosure.

In some examples, a player slot within the competition may open, such as when an existing player is defeated, killed or otherwise exits the competition. When this occurs, a character from the waiting area may be assigned to the open player slot, and the character may move from the waiting area to the competition area. Additionally, in some examples, an audience portion associated with the player that exited the competition may be removed from the competition audience and replaced with a new audience portion associated with the new player whose character has filled the open player slot. Referring now to FIG. 9, an example is shown in which player 101C has left the competition in competition area 310 and has been replaced by player 101D. To reflect this change in players, the character representation 103C associated with exiting player 101C (shown previously in FIG. 8) is replaced by character representation 103D associated with new player 101D (as shown in FIG. 9). Additionally, in this example, when player 101D replaces player 101C, the audience portion 350 (corresponding to spectator group 130C that receives game video stream 115C from player 101C) is replaced by audience portion 940 (corresponding to spectator group 130D that receives game video stream 115D from player 101D). As shown in FIG. 9, spectator group 130C has a quantity of two-hundred spectators, and therefore audience portion 940 includes four audience members 941-944 to reflect the quantity of two-hundred spectators in spectator group 130C.

FIG. 10 is a flowchart illustrating an example live camera video character generation process that may be used in accordance with the present disclosure. The process of FIG. 10 is initiated at operation 1010, at which a video game is executed that includes a character controlled by a player of the video game. The character is displayed by the video game using a character representation that includes a face-related portion and a body-related portion. For example, referring back to FIG. 1, a video game 170 may be executed that includes one or more players, such as player 101A and player 101B. As also shown in FIG. 1, the characters controlled by players 101A and 101B are displayed by the video game 170 using character representations 103A and 103B, respectively. The character representations 103A and 103B include face-related portions 21 and 22, respectively, and body-related portions 102A and 102B, respectively.

At operation 1012, live camera video is received that is captured from a camera, wherein portions of the live camera video include a face of the player. For example, referring back to FIG. 1, cameras 111A and 111B may be employed to capture live camera video 112A and 112B of players 101A and 101B, respectively. For example, cameras 111A and 111B may be webcams included in computer systems operated by players 101A and 101B. The live camera video 112A and 112B may each include video of a respective player 101A and 101B, including video of the player's face, as he or she participates in live gameplay. In some examples, live camera video 112A and 112B may each include video of a respective player 101A and 101B as he or she provides real-time commentary and/or discussion regarding live gameplay, for example in combination with corresponding audio of the player's voice.

At operation 1014, game video output is generated that includes the character representation, wherein the face-related portion of the character representation includes the portions of the live camera video that include the face of the player. For example, referring back to FIG. 1, the video game 170 may generate game video output 113A, which may be displayed to player 101A, for example on a display of a computer system operated by player 101A. The video game 170 may also generate game video output 113B, which may be displayed to player 101B, for example on a display of a computer system operated by player 101B. In some examples, the game video output 113A may include character representation 103A, character representation 103B and/or other character representations corresponding to other players. Game video output 113B may also include character representation 103A, character representation 103B and/or other character representations corresponding to other players. The face-related portion 21 of the character representation 103A corresponding to player 101A may include portions of the live camera video 112A that include the face of player 101A. The face-related portion 22 of the character representation 103B corresponding to player 101B may include portions of the live camera video 112B that include the face of player 101B. As described above, the video of a player's may be displayed live and in real-time within a face-related portion of a respective character within game video output. The use of live video may be advantageous, such as by allowing characters to reflect expressions (e.g., smiles, frowns, and other facial expressions) as they are being made, thereby allowing players and spectators to easily observe how different players are reacting to game events in real-time. In some examples, generating of the game video output may include providing, by the video game, frame rendering information to one or more graphics processing units (GPU's) for rendering of frames within the game video output. In some examples, the frame rendering information may include graphics information (e.g., position, texture, lighting, shadow and other information) for graphics and objects in a frame as well as the video contents that are inserted into the face-related portions of character representations in the frame. The one or more GPU's may then render the frames based on this information, and the rendered frames may be displayed as video output from the video game.

In some examples, operation 1014 may include sub-operations 1014A-D. In particular, at sub-operation 1014A, portions of the first live camera video that include the face of the player are detected, for example using one or more automated facial detection processes. In some examples, these automated facial detection processes may detect, within one or more frames, one or more shapes that are indicative of features of a face (e.g., ovular shapes for eyes, etc.) and that are at positions, distances and orientations relative to one another that approximately reflect positions, distances and orientations of those features that are common to actual human faces. For example, referring back to FIG. 2, a frame 209A of live camera video 112A includes a face 210A of player 101A. Additionally, a frame 209B of live camera video 112B includes a face 210B of player 101B. Faces 210A and 210B may be detected in frames 209A and 209B, respectively, using an automated facial detection process.

At sub-operation 1014B, the live camera video is cropped to form cropped video content that includes the portions of the first live camera video that include the face of the first player. For example, referring back to FIG. 2, upon detecting face 210A in frame 209A, an area 211A of frame 209A that corresponds to face 210A may be identified. Additionally, upon detecting face 210B in frame 209B, an area 211B of frame 209B that corresponds to face 210B may be identified. In some examples, areas 211A and 211B may be centered on the respective detected faces 210A and 210B. Upon being identified, the area 211A may be cropped from the frame 209A to form cropped video content 212A, while the area 211B may be cropped from the frame 209B to form cropped video content 212B. The cropped video content does not include one or more other portions of the live camera video that do not include the face of the player. For example, as shown in FIG. 2, cropped video content 212A does not include portions of frame 209A that are external to the area 211A and that do not include the face 210A. Additionally, cropped video content 212B does not include portions of frame 209B that are external to the area 211B and that do not include the face 210B. It is noted, however, that it is not required that the cropped video content must include an entire face of a respective player. For example, some areas along the edges of a face (e.g., top of scalp or hair, bottom of chin, ears, etc.) may sometimes not be included in the cropped video content. Moreover, it is also not required that the cropped video content must include only the face. For example, some areas along the edges of the cropped video content may extend beyond the face and may include background (e.g., walls, doors, etc.) that may be adjacent to the face. In some examples, background or other non-facial image content that is included in the cropped video content may be detected and replaced with padding, such as a solid color filler.

At sub-operation 1014C, the cropped video content is resized to a size that is selected for the face-related portion. For example, referring back to FIG. 2, cropped video content 212A may be resized into resized cropped video content 213A, which is equivalent to a selected size of face-related portion 21 in game video output 225. Similarly, the cropped video content 212B may be resized into resized cropped video content 213B, which is equivalent to a selected size of face-related portion 22 in game video output 225. At sub-operation 1014D, the resized cropped video content is inserted into the face-related portion. For example, referring back to FIG. 2, the resized cropped video content 213A may be inserted into face-related portion 21 of character representation 103A corresponding to player 101A. Additionally, the resized cropped video content 213B may be inserted into face-related portion 22 of character representation 103B corresponding to player 101B.

As described above, in some cases, players may temporarily step away from a camera or otherwise leave a camera's field of view during gameplay. Also, in some cases, a user could insert inappropriate content into a camera's field of view, such as obscene or offensive content. In some examples, one or more frames of the live camera video may be determined in which the face of the player is not detected, and the live camera video may be obfuscated (e.g., blurred, replaced with other content or content from prior frames, etc.) from the face-related portion for the one or more frames. For example, the face-related portion may include a blurred view of the live camera video or may include one or more prior (non-live) images of the player's face. In other examples, the live camera video may be replaced by a graphical icon or object in the face-related portion that indicates that the player's face cannot currently be detected in the live camera video. This may help to prevent inappropriate content from accidentally or even intentionally being included in the field of view of the camera and inserted into the face-related portion of the character.

Figure 11:
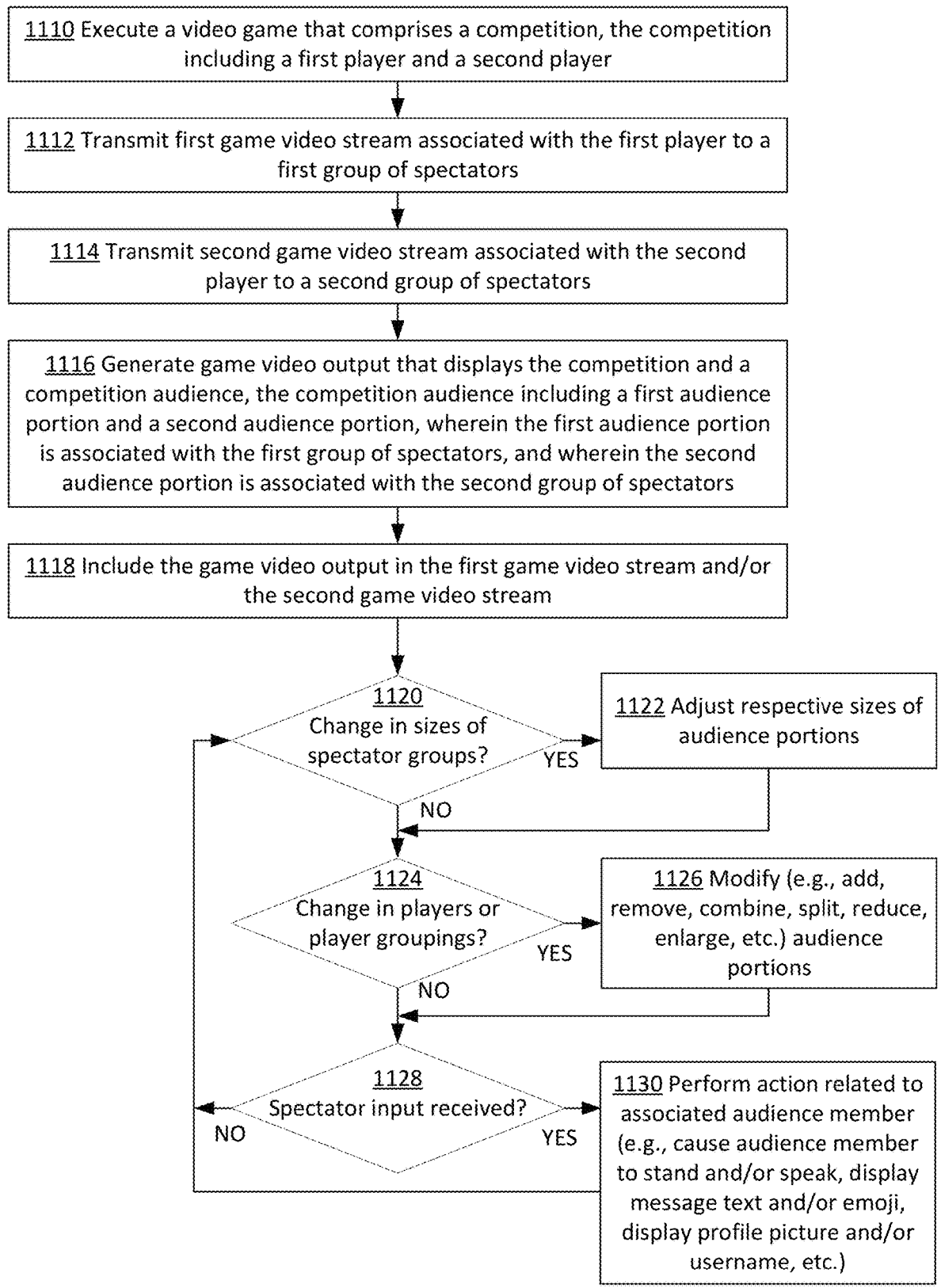
FIG. 11 is a flowchart illustrating an example player, spectator and audience interaction process that may be used in accordance with the present disclosure.

FIG. 11 is a flowchart illustrating an example player, spectator and audience interaction process that may be used in accordance with the present disclosure. The process of FIG. 11 is initiated at operation 1110, at which a video game is executed that comprises a competition, the competition including a first player and a second player. For example, referring back to FIG. 1, video game 170 may comprise a competition that includes players 101A and 101B. For example, players 101A and 101B may be competing against one another or may be on a team competing against one or more other players. At operation 1112, a first game video stream associated with the first player is transmitted to a first group of spectators. For example, referring back to FIG. 1, game video stream 115A associated with player 101A is transmitted to spectator group 130A. The first game video stream associated with the first player is also displayed to the first group of spectators. At operation 1114, a second game video stream associated with the second player is transmitted to a second group of spectators. For example, referring back to FIG. 1, game video stream 115B associated with player 101B is transmitted to spectator group 130B. The second game video stream associated with the second player is also displayed to the second group of spectators.

At operation 1116, game video output is generated that displays the competition and a competition audience, the competition audience including a first audience portion and a second audience portion, wherein the first audience portion is associated with the first group of spectators, and wherein the second audience portion is associated with the second group of spectators. As described above, in some examples, rendered frames of the game video output may be generated by one or more GPU's for example based on frame rendering information provided by the video game. Referring back to FIG. 3, a game display 300 is shown that may be included in game video output 113A and/or game video output 113B. The game display 300 includes a competition area 310, which displays a competition that includes players 101A and 101B, such as by including character representation 103A (controlled by player 101A) and character representation 103B (controlled by player 101B). The game display 300 also includes a competition audience that comprises audience portions 330 and 350. Audience portion 330 is associated with spectator group 130A, which receive game video stream 115A associated with player 101A. Audience portion 350 is associated with spectator group 130B, which receive game video stream 115B associated with player 101B. Relative sizes of the first audience portion and the second audience portion are based on relative sizes of the first group of spectators and the second group of spectators. As indicated in FIG. 3, spectator group 130A has a quantity of one-hundred spectators, while spectator group 130B has a quantity of two-hundred spectators. In the example of FIG. 3, each audience member 331-332 and 341-344 represents fifty spectators. Specifically, because the spectator group 130A includes one-hundred spectators, audience portion 330 includes two audience members 331-332 representing fifty spectators each. Additionally, because the spectator group 130B includes two-hundred spectators, audience portion 330 includes four audience members 341-344 representing fifty spectators each. Thus, in the example of FIG. 3, the relative sizes (e.g., quantities of included audience members) of audience portions 330 and 340 are based on (e.g., are proportional to) relative sizes (e.g., quantities of included spectators) of the respective spectator groups 130A and 130B.

At operation 1118, the game video output is included in the first game video stream and/or the second game video stream. For example, as described above, game display 300 may be included in game video output 113A and/or game video output 113B. As shown in FIG. 1, game video output 113A may in turn be included in game video stream 115A that is associated with player 101A and transmitted to spectator group 130A, while game video output 113B may in turn be included in game video stream 115B that is associated with player 101B and transmitted to spectator group 130B.

Figure 4:
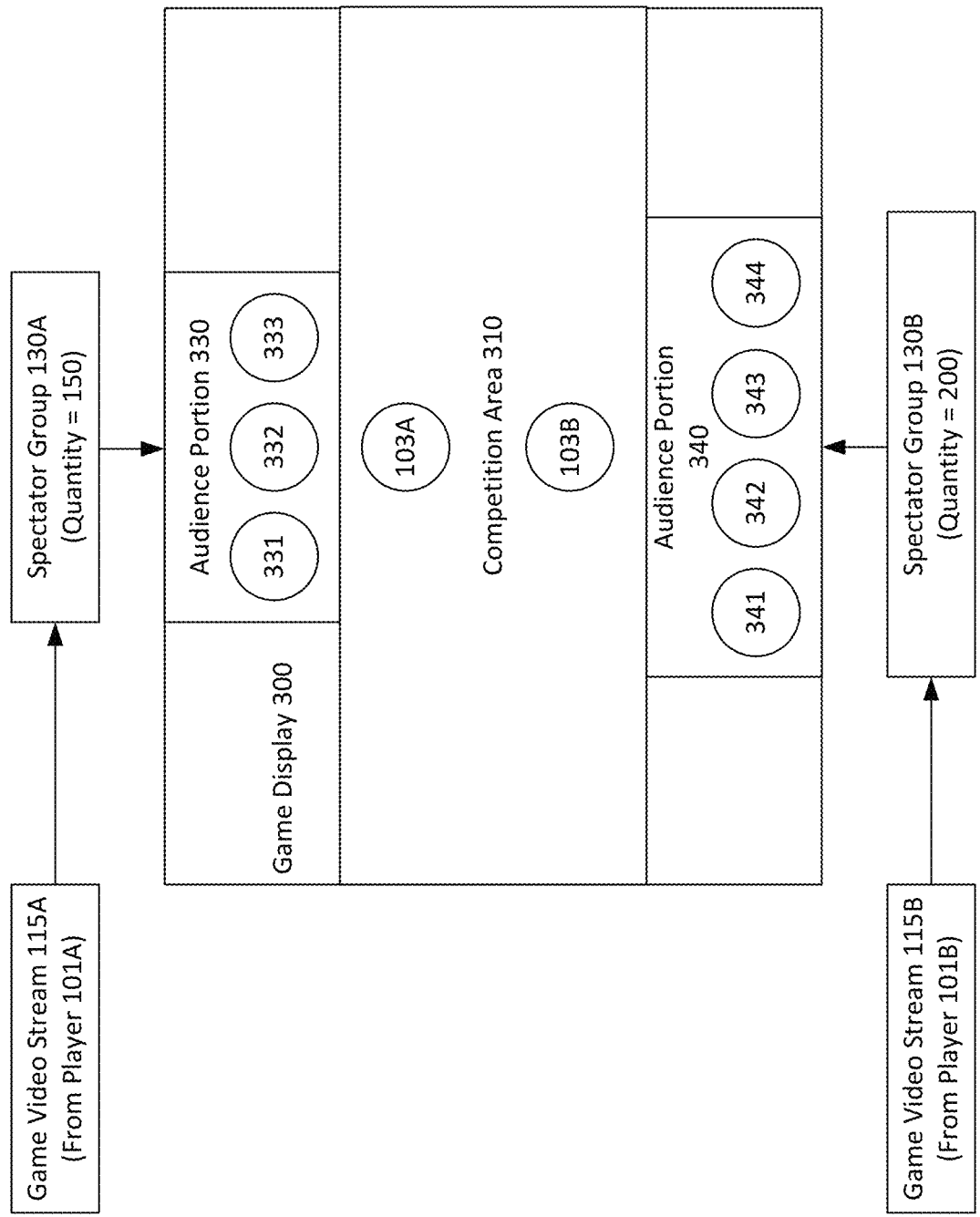
FIG. 4 is a diagram illustrating an example audience portion size adjustment that may be used in accordance with the present disclosure.

At operation 1120, it is determined if there is a change in the sizes of the first and/or second spectator groups. If so, at operation 1122, respective sizes of the first, second and/or other audience portions may be adjusted. As described above, relative sizes of the first audience portion and the second audience portion may be adjusted dynamically based on changes to the relative sizes of the first group of spectators and the second group of spectators. For example, as shown in FIG. 4, when the size of spectator group 130A increases from one-hundred to one-hundred-fifty, an additional third audience member 333 is added to audience portion 330 to represent the fifty additional spectators that have been added to spectator group 130A.

At operation 1124, it is determined if there is a change in players and/or player groupings. If so, at operation 1126, the first, second and/or other audience portions may be modified, such as by adding, deleting, combining, splitting, reducing, and/or enlarging the audience portions. For example, if a new player joins the competition, then a new audience portion for the new player may be inserted or an existing audience portion may be modified based on the addition of the new player. Additionally, if an existing player exits the competition, then an existing audience portion for the existing player may be removed or an existing audience portion may be modified based on the exiting of the existing player. Furthermore, in some examples, a combined audience portion may be formed to represent a grouping of players, such as a team. For example, if the first player and the second player are combined onto a team, then the first audience portion and the second audience portion may be combined into a combined audience portion. A size of the combined audience portion may be based on a combination of a size of the first spectator group and a size of the second spectator group. If a player joins a player grouping, then a respective audience portion may be modified, such as by enlarging the size of the combined audience portion. If a player leaves a player grouping (or if the player grouping dissolves), then a respective audience portion may be modified, such as by splitting, reducing the size, and/or dissolving the audience portion. For example, when a first player and a second player are split from a same team, the combined audience portion for the team may be split back into the first audience portion and the second audience portion.

At operation 1128, it is determined if spectator input is received. If so, at operation 1130, an action related to an associated audience member is performed, such as causing the audience member to stand and/or speak, displaying message text and/or an emoji adjacent to the audience member, displaying a profile picture and/or username adjacent to the audience member, and the like. For example, a spectator may be either temporarily or permanently associated with an audience member, such as in response to the spectator providing user input. Additionally, an action related to an audience member may be performed based on user input (e.g., chat input, voice input, emoji input, or voting in a poll) provided by an associated spectator. For example, referring back to FIG. 5A, it is seen that a particular spectator (SPECTATOR999) from spectator group 130B may be associated with audience member 343. In some examples, a face associated with an audience member may be rendered based on an image (e.g., profile picture) of the associated spectator. Also, in some examples, an identifier (e.g., username) and/or profile picture of an associated spectator may be displayed at a location associated with an audience member. For example, as shown in FIG. 5A, an identity of SPECTATOR999 (e.g., the username SPECTATOR999) is displayed in a username field 501 adjacent to the audience member 343. Additionally, a profile picture 505 of SPECTATOR999 is displayed adjacent to audience member 343. In some examples, the action related to the audience member that is performed may include causing the audience member to perform at least one of speaking or standing. In the example of FIG. 5A, audience member 343 stands up based on the user input provided by SPECTATOR999. The action may also include displaying at least one of text, emojis, or graphics at a location associated with the first audience member. In the example of FIG. 5A, a checkmark icon 503 is displayed adjacent to audience member 343 to indicate that SPECTATOR999 has voted YES in a poll. Additionally, a message field 502 displays text of a chat message submitted by SPECTATOR999. In some examples, audience member 343 may speak the text of the chat message displayed in message field 502.

Figure 12:
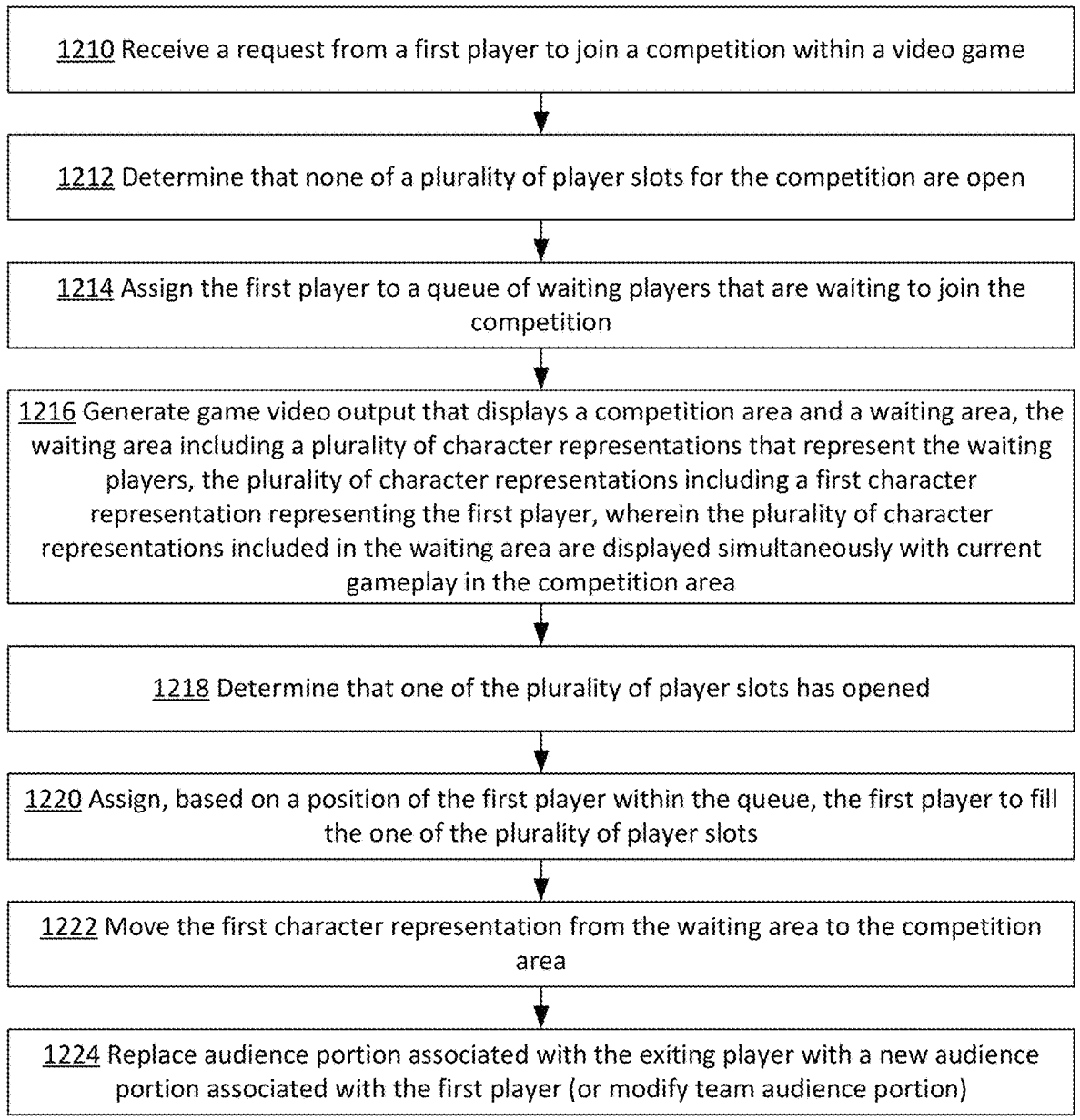
FIG. 12 is a flowchart illustrating an example queueing and audience interaction process that may be used in accordance with the present disclosure.

FIG. 12 is a flowchart illustrating an example queueing and audience interaction process that may be used in accordance with the present disclosure. The process of FIG. 12 is initiated at operation 1210, at which a request is received from a first player to join a competition within a video game. For example, a player may request to join a competition, such as by providing user input indicative of the request. In some examples, the user input may be received via a video game client application executing on a computing device operated by the player. In some examples, the user input may then be provided from the video game client application to a video game server, such as may maintain game state for the video game. At operation 1212, it is determined that none of a plurality of player slots for the competition are open. For example, a video game server may assign players to player slots associated with a competition that occurs within the video game. The video game server may also maintain game state that includes current assignments of players to player slots. In some cases, when the video game server receives a player's request to join a competition, the video game server may examine the current assignments of players to player slots to determine whether any player slots for the competition are currently open. In this example, it is determined that none of the player slots for the competition are currently open. At operation 1214, the first player is assigned to a queue of waiting players that are waiting to join the competition. For example, the video game may maintain a queue of waiting players. Upon determining that none of the player slots for the competition are currently open, the video game may assign the first player to the queue of waiting players.

At operation 1216, game video output is generated that displays a competition area and a waiting area, the waiting area including a plurality of character representations that represent the waiting players, the plurality of character representations including a first character representation representing the first player, wherein the plurality of character representations included in the waiting area are displayed simultaneously with current gameplay in the competition area. As described above, in some examples, rendered frames of the game video output may be generated by one or more GPU's for example based on frame rendering information provided by the video game. Referring back to FIG. 8, it is seen that game display 300 may be included in game video output generated by the video game. In FIG. 8, the game display 300 includes a competition area 310 and a waiting area 859. The waiting area 859 includes a queue 850 that includes character representations 130D-G that represent the waiting players. In particular, character representation 103D may represent the first player (e.g., player 101D). The plurality of character representations 130D-G included in the waiting area 859 are displayed simultaneously with current gameplay in the competition area 310, such as a competition between character representations 103B and 103C.

At operation 1218, it is determined that one of the plurality of player slots has opened. For example, an existing player in a competition may be killed or defeated or may otherwise exit the game. When this occurs, the video game may update the game state and may accordingly update the current assignment of players to player slots to reflect that a player slot associated with the exiting player has opened. At operation 1220, the first player is assigned, based on a position of the first player within the queue, to fill the one of the plurality of player slots that has opened. For example, as shown in FIG. 8, character representation 103D is at the front (e.g., rightmost position) of the queue 850 and therefore has the highest priority of players in the queue 850 for filling an open player slot in the competition. Thus, in this example, the player 101D that controls character representation 103D is assigned to join the competition. It is noted that character representation 103D may initially be placed at the back (e.g., leftmost position) of the queue 850 when the join request is initially received and may be gradually moved towards the front of queue 850 as other higher priority queued players join the competition.

At operation 1222, the first character representation is moved from the waiting area to the competition area. For example, referring back to FIG. 9, an example is shown in which player 101C has left the competition in competition area 310 and has been replaced by player 101D. To reflect this change in players, the character representation 103C associated with exiting player 101C (shown previously in FIG. 8) is replaced by character representation 103D associated with new player 101D (as shown in FIG. 9). At operation 1224, an audience portion associated with the exiting player is replaced with a new audience portion associated with the first player. For example, as shown in FIG. 9, when player 101D replaces player 101C, the audience portion 350 (corresponding to spectator group 130C that receives game video stream 115C from player 101C) is replaced by audience portion 940 (corresponding to spectator group 130D that receives game video stream 115D from player 101D). As shown in FIG. 9, spectator group 130C has a quantity of two-hundred spectators, and therefore audience portion 940 includes four audience members 941-944 to reflect the quantity of two-hundred spectators in spectator group 130C. It is noted that, in some examples, as opposed to creating a new audience portion associated with the first player, an existing audience portion may instead be modified based on the first player. For example, if the first player joins the competition as part of a team, then a combined audience portion for the team may be resized based on the size of spectator group 130C that receives game video stream 115C from player 101C. For example, if the exiting player was also part of the team, then the combined audience portion for the team may be resized to account for a difference in size between the exiting player's spectator group and the first player's spectator group.

Figure 13:
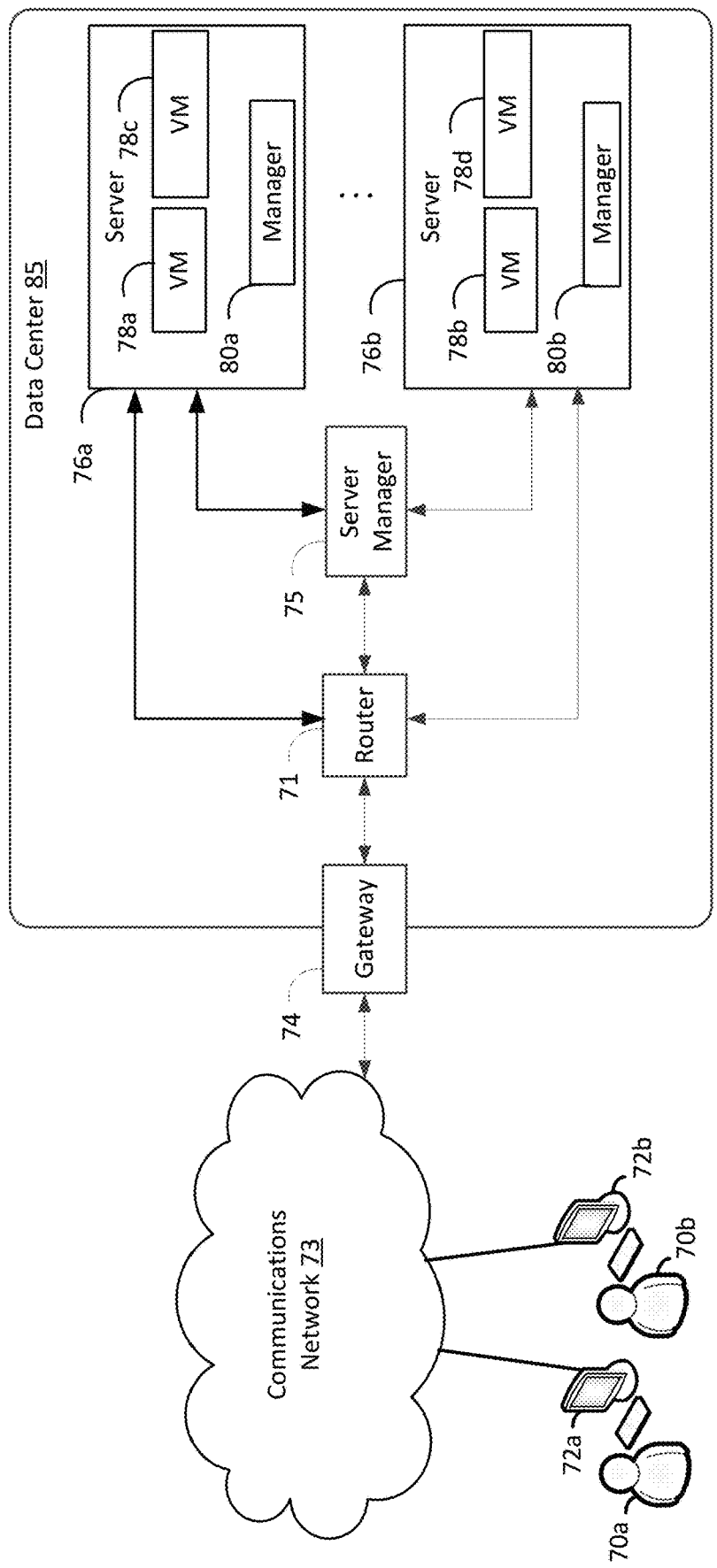
FIG. 13 is a diagram illustrating an example system for transmitting and providing data that may be used in accordance with the present disclosure.

An example system for transmitting and providing data will now be described in detail. In particular, FIG. 13 illustrates an example computing environment in which the embodiments described herein may be implemented. FIG. 13 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 13, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 13 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 13, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 13, a server manager 75 is also employed to at least in part direct various communications to, from and/or between servers 76*a* and 76*b*. While FIG. 13 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 13 has been greatly simplified and that many more networks and networking devices may be utilized to interconnect the various computing systems disclosed herein. These network topologies and devices should be apparent to those skilled in the art.

It should also be appreciated that data center 85 described in FIG. 13 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 14:
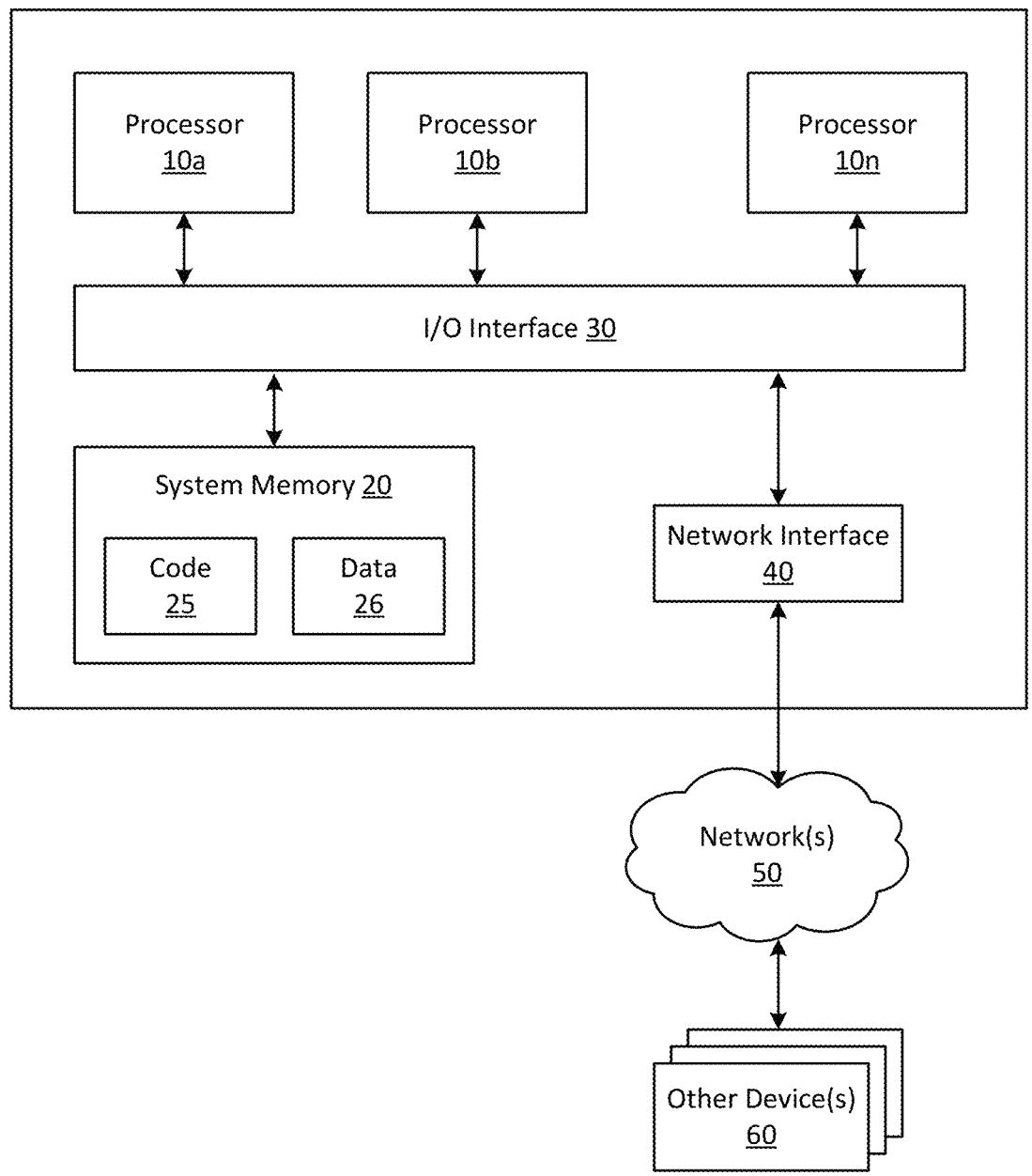
FIG. 14 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 14 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
executing a video game that includes a first character controlled by a first player of the video game, wherein the first character is displayed by the video game using a first character representation that includes a first face-related portion and a first body-related portion;
receiving first live camera video captured from a first camera, wherein portions of the first live camera video include a face of the first player;
generating game video output including the first character representation, wherein the first face-related portion of the first character representation includes the portions of the first live camera video that include the face of the first player;
determining one or more frames of the first live camera video in which the face of the first player is not detected; and
obfuscating the first live camera video from the first face-related portion for the one or more frames.

2. The computing system of claim 1, wherein generating the game video output comprises detecting the portions of the first live camera video that include the face of the first player using one or more automated facial detection processes.

3. The computing system of claim 1, wherein the video game further includes a second character controlled by a second player of the video game, wherein the second character is displayed by the video game using a second character representation that includes a second face-related portion and a second body-related portion.

4. The computing system of claim 3, wherein the operations further comprise:
receiving second live camera video captured from a second camera, wherein portions of the second live camera video include a face of the second player, wherein the second face-related portion of the second character representation includes the portions of the second live camera video that include the face of the second player.

5. A computer-implemented method comprising:
executing a video game that includes a first character controlled by a first player of the video game, wherein the first character is displayed by the video game using a first character representation that includes a first face-related portion and a first body-related portion;

receiving first live camera video captured from a first camera, wherein portions of the first live camera video include a face of the first player;

generating game video output including the first character representation, wherein the first face-related portion of the first character representation includes the portions of the first live camera video that include the face of the first player;

determining one or more frames of the first live camera video in which the face of the first player is not detected; and obfuscating the first live camera video from the first face-related portion for the one or more frames.

6. The computer-implemented method of claim 5, wherein the first body-related portion includes graphics generated by the video game.

7. The computer-implemented method of claim 5, wherein generating the game video output comprises detecting the portions of the first live camera video that include the face of the first player using one or more automated facial detection processes.

8. The computer-implemented method of claim 7, wherein generating the game video output further comprises cropping the first live camera video to form cropped video content that includes the portions of the first live camera video that include the face of the first player.

9. The computer-implemented method of claim 8, wherein generating the game video output further comprises resizing the cropped video content to a size that is selected for the first face-related portion.

10. The computer-implemented method of claim 9, wherein generating the game video output further comprises inserting the cropped video content, after it is resized, into the first face-related portion.

11. The computer-implemented method of claim 5, wherein the first face-related portion is attachable to, and detachable from, the first body-related portion.

12. The computer-implemented method of claim 5, wherein the video game further includes a second character controlled by a second player of the video game, wherein the second character is displayed by the video game using a second character representation that includes a second face-related portion and a second body-related portion.

13. The computer-implemented method of claim 12, further comprising:

receiving second live camera video captured from a second camera, wherein portions of the second live camera video include a face of the second player, wherein the second face-related portion of the second character representation includes the portions of the second live camera video that include the face of the second player.

14. One or more non-transitory computer-readable storage media having stored thereon computing instructions that, upon execution by one or more computing devices, cause the one or more computing devices to perform operations comprising:

executing a video game that includes a first character controlled by a first player of the video game, wherein the first character is displayed by the video game using a first character representation that includes a first face-related portion and a first body-related portion;

receiving first live camera video captured from a first camera, wherein portions of the first live camera video include a face of the first player;

generating game video output including the first character representation, wherein the first face-related portion of the first character representation includes the portions of the first live camera video that include the face of the first player;

determining one or more frames of the first live camera video in which the face of the first player is not detected; and obfuscating the first live camera video from the first face-related portion for the one or more frames.

15. The one or more non-transitory computer-readable storage media of claim 14, wherein generating the game video output comprises detecting the portions of the first live camera video that include the face of the first player using one or more automated facial detection processes.

16. The one or more non-transitory computer-readable storage media of claim 15, wherein generating the game video output further comprises cropping the first live camera video to form cropped video content that includes the portions of the first live camera video that include the face of the first player.

17. The one or more non-transitory computer-readable storage media of claim 16, wherein generating the game video output further comprises resizing the cropped video content to a size that is selected for the first face-related portion.

18. The one or more non-transitory computer-readable storage media of claim 14, wherein the video game further includes a second character controlled by a second player of the video game, wherein the second character is displayed by the video game using a second character representation that includes a second face-related portion and a second body-related portion.

19. The one or more non-transitory computer-readable storage media of claim 18, wherein the operations further comprise:

receiving second live camera video captured from a second camera, wherein portions of the second live camera video include a face of the second player, wherein the second face-related portion of the second character representation includes the portions of the second live camera video that include the face of the second player.

* * * * *